US010691302B2

(12) United States Patent
Marzouk

(10) Patent No.: US 10,691,302 B2
(45) Date of Patent: Jun. 23, 2020

(54) USER INTERFACE FOR LEARNING MANAGEMENT SYSTEM

(71) Applicant: Juci Inc., Menlo Park, CA (US)

(72) Inventor: Sharon Eva Marzouk, Menlo Park, CA (US)

(73) Assignee: JUCI INC., Menlo Park, CA (US)

( * ) Notice: Subject to any disclaimer, the term of this patent is extended or adjusted under 35 U.S.C. 154(b) by 55 days.

(21) Appl. No.: 16/028,300

(22) Filed: Jul. 5, 2018

(65) Prior Publication Data

US 2019/0012046 A1 Jan. 10, 2019

Related U.S. Application Data

(60) Provisional application No. 62/529,845, filed on Jul. 7, 2017.

(51) Int. Cl.
| | | |
|---|---|---|
| *G06F 3/00* | (2006.01) | |
| *G06F 3/0482* | (2013.01) | |
| *G09B 5/02* | (2006.01) | |
| *G06F 3/0486* | (2013.01) | |
| *G09B 5/00* | (2006.01) | |

(52) U.S. Cl.
CPC .......... *G06F 3/0482* (2013.01); *G06F 3/0486* (2013.01); *G09B 5/00* (2013.01); *G09B 5/02* (2013.01); *G06F 2203/04804* (2013.01)

(58) Field of Classification Search
CPC ................. G06F 3/0482; G06F 3/0486; G06F 2203/04804; G09B 5/02; G09B 5/00
See application file for complete search history.

(56) References Cited

U.S. PATENT DOCUMENTS

| 7,927,105 B2* | 4/2011 | Griffin | G06Q 10/0639 |
| | | | 434/219 |
| 8,182,270 B2* | 5/2012 | Elzinga | G09B 7/00 |
| | | | 434/322 |
| 2002/0188583 A1 | 12/2002 | Rukavina et al. | |
| 2003/0152902 A1* | 8/2003 | Altenhofen | G09B 5/00 |
| | | | 434/350 |

(Continued)

OTHER PUBLICATIONS

"E-learning methodologies: A guide for designing and developing e-learning courses", Food and Agriculture Organization (2011), 141 pages.

(Continued)

*Primary Examiner* — Kieu D Vu
*Assistant Examiner* — Asteway T Gattew
(74) *Attorney, Agent, or Firm* — Ascenda Law Group, PC

(57) ABSTRACT

A GUI for an LMS includes a plurality of graphical modules, each representing a lesson, medium, or deliverable for a project. Each module has attributes permitting interconnection with other modules within the context of the project when moved adjacent to one another within a course creation workspace. The course creation workspace includes a visual editing facility allowing a user to assemble the project through drag and drop interconnection of the modules within a project prompt that is a visual instantiation of learning goals associated with an educational standard. Such assembly automatically generates lesson content and associates badges representing the lessons, which badges become available to students as they complete the respective lessons.

19 Claims, 28 Drawing Sheets

(56) References Cited

U.S. PATENT DOCUMENTS

| | | | |
|---|---|---|---|
| 2005/0208461 A1 | 9/2005 | Krebs et al. | |
| 2006/0154227 A1* | 7/2006 | Rossi | G09B 5/14 |
| | | | 434/350 |
| 2008/0254434 A1 | 10/2008 | Calvert | |
| 2008/0261191 A1* | 10/2008 | Woolf | G06Q 50/20 |
| | | | 434/323 |
| 2009/0305200 A1 | 12/2009 | Gorup et al. | |
| 2011/0065082 A1* | 3/2011 | Gal | G09B 7/02 |
| | | | 434/365 |
| 2012/0276516 A1 | 11/2012 | Teskey et al. | |
| 2013/0011822 A1 | 1/2013 | Messner et al. | |
| 2014/0099622 A1 | 4/2014 | Arnold et al. | |
| 2014/0272892 A1* | 9/2014 | Rozycki | G09B 5/08 |
| | | | 434/350 |
| 2015/0170303 A1* | 6/2015 | Geritz | G06Q 10/00 |
| | | | 705/326 |
| 2016/0148524 A1 | 5/2016 | Pulido et al. | |

OTHER PUBLICATIONS

Haythornthwaite; et al. "The SAGE Handbook of E-learning Research", Second edition, SAGE Publications Ltd (2016), 20 pages.
International Search Report and Written Opinion dated Oct. 3, 2018, from the ISA/US, for International Patent Application No. PCT/US18/41103 (filed Jul. 6, 2018), 12 pages.

* cited by examiner

USER INTERFACE FOR LEARNING MANAGEMENT SYSTEM

RELATED APPLICATIONS

This is a NONPROVISIONAL of, claims priority to, and incorporates by reference U.S. Provisional Application No. 62/529,845, filed Jul. 7, 2017.

FIELD OF THE INVENTION

The present invention relates generally to a learning management system (LMS) and, more specifically, to a graphical user interface (GUI) for an LMS.

BACKGROUND

Learning management systems may be generally regarded as software applications, sometimes delivered as a service over the Internet, that facilitate the creation, documentation, administration, and delivery of educational content, often in the form of formal courses and training programs. Among the typical features of such systems are content creation tools that allow instructors to develop the educational content, assessments and quizzes based on that content, and curricula for delivery of the content. Students enrolled in courses offered through such systems are often provided with individual workspaces that allow them to receive assignments, submit work product, and monitor their progress through the associated course subject matter.

While present LMS systems provide some useful facilities for teachers and students, most are designed around conventional computer user interfaces that make use of drop-down menus, text fields, and tabular displays of information and options. User interfaces (UI) that rely on such conventions present obstacles for both teachers and students because they presume a certain familiarity with information input and retrieval paradigms. For those unfamiliar with such UI elements, creating content as part of a course development activity, and/or retrieving it as part of a learning process can be a significant challenge. For example, correctly navigating a menu and field-driven UI to create a new course often requires an initial understanding of the LMS developer's assumptions regarding such activities. Only by understanding these assumptions can the course developer appreciate how the various fields and menus presented via the UI interrelate to one another and how information designated though selection and other interaction with the UI elements will ultimately be presented and provided to students enrolled in the course. That understanding often requires the course developer to undergo special training in the use of the LMS before he or she can engage in any course development. Thus, while the LMS may ultimately assist in development of the course, for the course developer the initial obstacles that must be overcome before the features of the LMS can even be utilized are often substantial.

SUMMARY OF THE INVENTION

Recognizing the impediments for rapid and intuitive course development and student interaction attendant in many existing learning management systems, the present inventor has developed a new and useful GUI for an LMS. In one embodiment of the invention, such a GUI includes a plurality of graphical modules, each of the modules representing one of: a lesson (or one or more steps in a lesson where a single lesson is broken into multiple steps or components), a medium, or a deliverable for a project. Each of the modules have attributes which permit interconnection with compatible other ones of the modules within the context of the project when moved adjacent to one another within a course creation workspace. In some embodiments, interconnection is permitted only with certain compatible other ones of the modules, for example where necessary prerequisites of the lesson, medium, or deliverable represented by the subject module have been or will be fulfilled, as represented by inclusion of modules representing said prerequisites within the context of the project.

The course creation workspace includes a visual editing facility allowing a user to assemble the project through drag and drop interconnection of selected and compatible ones of the modules within defined lesson, medium, and deliverable regions of a project prompt that is a visual instantiation of learning goals associated with an educational standard. Such assembly automatically associates badges representing the lessons, media, and/or deliverables as they become associated with the project prompt. The badges become available to students, e.g., are automatically associated with and/or included in student profiles, as the students complete the respective lessons and/or complete instruction associated with the media and/or deliverables.

A menu is adjacent one boundary of the course creation workspace, and allows user navigation among collections of the modules. Menu options may be customized to the user. An information ribbon is adjacent a second boundary of the course creation workspace, and displays a minimum suggested grade level for the project and projected teaching times, activity times and total times for course material represented by those of the modules assembled within the course creation workspace. These projected teaching times, activity times and total times are automatically updated as various ones of the modules are associated with and dissociated from the project prompt; that is, as the various ones of the modules are included in or removed from learning paths that define the project.

The GUI also includes a module editor having attribute fields for a user to define aspects of a desired module representing a lesson, a medium, or a deliverable, add content thereto, and to provide a command to generate the desired module automatically, based on the defined aspects. This editor is selectable at least from the menu and may also be selected through other navigation means. In some embodiments, the module editor is configured to allow user revision of an existing one of the modules through selection of an option to edit that existing one of said modules. Further, the module editor may be configured to allow user cloning of an existing one of the modules through selection of an option to clone a module.

In some embodiments of the present GUI, the menu includes options for filtering the collections of the modules by one or more attributes. User navigation via the menu and/or module availability may be restricted according to one or more of: user type, user role, user group, and user enrollment.

Within the present GUI, the modules may be visually represented by blocks, each having one or interconnection points and a graphical image. The graphical images associated with the blocks may also be used within a badge map. The badge map is a collection of badges; that is, visual representations of student achievements or skills. Each badge may have a respective graphical image which corresponds to the graphical image of a respective block that visually represents a respective one of the modules. The badges may be organized by type (e.g., subject matter) and required skill level of the modules to which the corresponding badges pertain. In some embodiments, color may be used to represent proximity of relationship/similarity in subject matter to visually relate one subject matter to another. Thus, a rainbow of colors may represent a spectrum of available subject matters. Organization along multiple axes such as these allows for visual representation of breadth and depth of knowledge/skills when the badges are incorporated in a student profile.

The GUI may also include student profiles. Each profile may be associated with a respective student, and each may include a student badge map in which a collection of badges, such as those described above, is displayed. Profiles may also include links to projects, forming a cohesive portfolio of skills and completed work product. Within a student profile, badges may be organized by type (e.g. subject matter) and required skill level of the modules to which the corresponding badges pertain. Alternatively, or in addition, badges may be organized by subject matter and order in which they were completed. Badges represented in a profile may be representative of lessons, etc., which have been completed by the respective student. Further, badges associated with yet-to-be completed lessons, etc., may be included in a profile but indicated in a fashion (e.g., grayed out, shown in dashed outline, etc.) so as to indicate their inchoate nature. Badge maps, whether for individual students, projects, or other organizational elements may be represented in a circular form, e.g., in which color represents badge type (subject matter) and radial distance of a badge from a center of the circle represents required skill level or sequence of completion of the corresponding module, and/or in a two-dimensional, e.g., grid, form. In some instances, badge maps may be represented in three-dimensional forms, such as cubes, etc. To allow for ease of viewing, the graphical images of the badges within a badge map may be displayed only when the badge map itself is displayed at some, but not all, magnification levels.

The present GUI may also include a learning path generator within which a learning path for the project is automatically created as ones of the modules are associated with and dissociated from the project prompt. Such a learning path may be represented by respective graphical images which correspond to respective blocks that visually represent respective ones of the modules associated with the project. In addition, a presentation generator within which presentation objects associated with ones of the modules are automatically created and organized in sequence as said ones of the modules are associated with and dissociated from the project may be included.

The present GUI further may include a user selectable element for publishing a project. Such a facility allows a user to publish a project, course, etc., once it has been created, allowing student enrollment therein. Publishing a project also may publish individual asserts, e.g., lessons, media, and/or deliverables, created as the user was assembling the project. Upon publishing a project, various metrics can be computed or entered by user, and that information can feedback into the system to provide enhanced information concerning projects.

In one embodiment of the invention, the course creation workspace may be rendered within a first displayed content layer of the GUI. A second displayed content layer, within which is rendered a video presentation, an audio-video presentation, or an animated video or audio-video presentation, may be displayed so as to appear to be above or below the first displayed content layer to demonstrate drag and drop techniques used for creating a project, etc. For example, blocks representing corresponding ones of at least some of the modules rendered within the first displayed content layer may be represented within the video played within the second content layer. The modules rendered within the first displayed content layer are made selectable by a user, e.g., via manipulation of a cursor control device, to mimic displacement and organization of corresponding ones of the blocks included within the video rendered within the second displayed layer. Such a video underlay technique is not restricted to the GUI for the LMS described above, and may be more generally applied in any GUI to teach drag and drop programming techniques for visual, block-based programming. Where the second displayed content layer within which the video, audio-video, or animated presentation is played is presented so as to appear above the first displayed content layer, the second displayed content layer should be rendered so as to appear semi-transparent to allow the user to see the content displayed in the first displayed content layer. In either instance, the content displayed in the second displayed content layer may be paused, automatically and/or by the user, so that the user can mimic the demonstrated operations with objects in the first displayed content layer.

These and further embodiments of the invention are described in greater detail below.

BRIEF DESCRIPTION OF THE DRAWINGS

The present invention is illustrated by way of example, and not limitation, in the figures of the accompanying drawings, in which:

FIG. 6A shows an example of a lesson template, in accordance with an embodiment of the invention.

FIG. 6B shows an example of a drop down menu presenting available block types for projects, lessons, mediums, and deliverables, in accordance with an embodiment of the invention.

FIG. 6C illustrates an example of a completed template that specifies block attributes for a medium.

DETAILED DESCRIPTION

Figure 1:
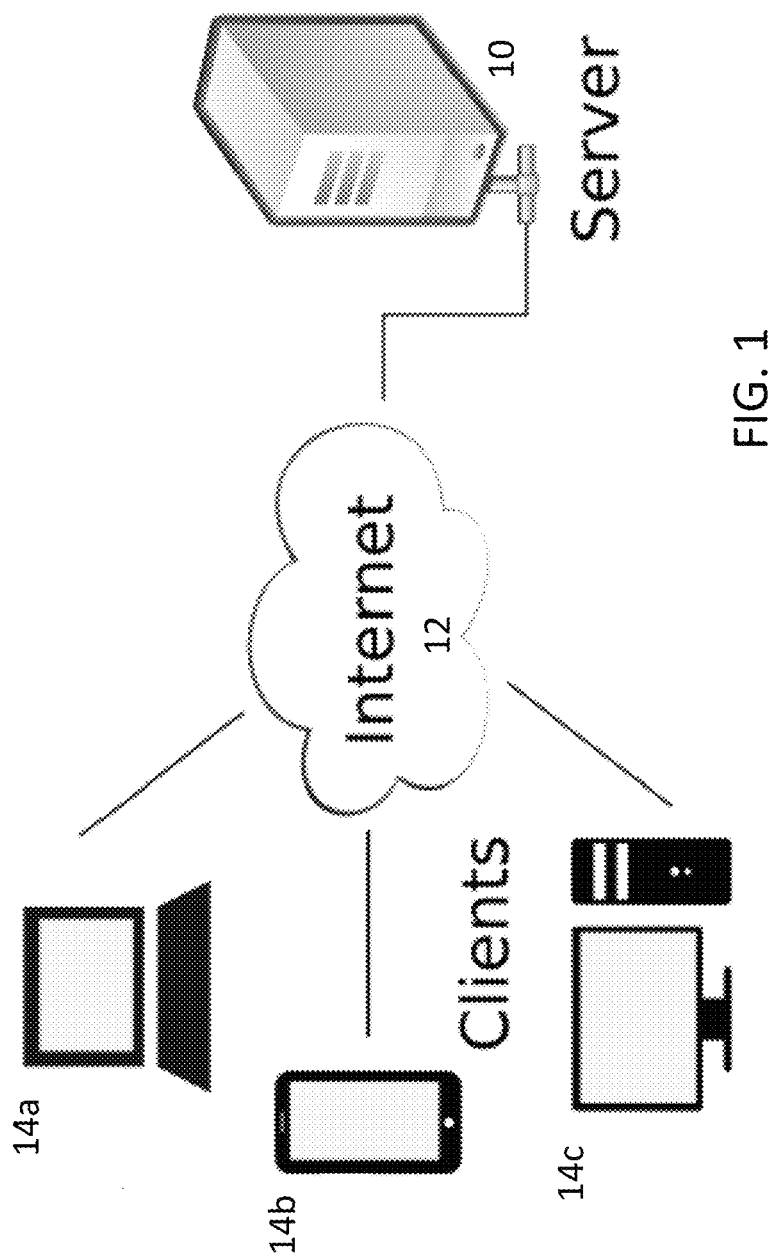
FIG. 1 illustrates a distributed computing environment within which embodiments of the present GUI may be made available to users at clients that are communicably coupled to a server in which the LMS of which the present GUI is a part is instantiated.

Embodiments of the present invention provide a computer-based system for creating, editing, publishing, and interacting with educational materials in a project-based manner. The present system scaffolds and tracks both learning and the project creation process, allows users to visualize complex information intuitively and quickly, and fosters cross collaboration amongst teachers, amongst learners, and between teachers and learners. Further, the system provides a solution for learners to study information, develop skills, and create work product, while also giving content providers an easy way to contribute what they know in an organized and structured manner. Learners may also create their own projects, learning goals, and courses and collaborate with one another, for example, by sharing their work product.

Aspects of the present system intertwine learning and doing, while tying these processes to a purpose. The system is flexible enough to allow users to create learning paths of any kind, and track user goals, progress, and outcomes along such paths. The system also allows teachers and students to share outcomes of their respective project creation and learning in the form of projects and deliverables, allowing others to follow or modify learning paths associated with these projects.

Among other things, embodiments of the present invention provide:

an organized and intuitive, connected and intertwined flow for learning, lesson creation, original and specific project creation, tracking of gained skills and portfolios of projects, acquiring of needed project materials, achieving of needed academic standards, and adding, assessing and tracking learner progress;

easy and flexible customized course creation/automation;

an all-in-one learning system allowing users to learn and create projects while tracking learning and seeing paths for growth;

personalized learning with choose-your-own path and pace;

scaffolded project creation and posting;

flexible yet structured means to produce original projects with clear objectives and goals;

teacher tracking;

facilities for multiple tools and mediums being used in classroom at same time;

project-based with tangible learnings;

visually see-where-you've-been and where-you-are-going representations, allowing users and teachers to track learning and progress and to accumulate portfolios of projects;

copy-and-then-modify learning paths of projects, allowing others to benefit from previously created works;

mappings of any project;

facilities to download, clone, and/or remix previously created project code for a new project;

facilities for seeing maker tools play together/easily combine multiple mediums and/or subject matters for new results;

a platform for creating and organizing educational materials and methods (especially collaboratively);

templates to create projects of good form;

means for lessons to be pulled from interdisciplinary subject areas to form a cohesive learning experience;

a modular language and form that allows a community to build singular or plural lessons that can be arranged into a cohesive learning experience;

an intuitive means for teaching and learning drag and drop programming languages;

organized creation and storage of multimedia with fluid rating and submission systems; and project portfolios with multimedia content.

Referring now to FIG. 1, in one embodiment the present system is instantiated as an LMS application running on a server 10 accessible via the Internet 12 (and/or other networks or networks of networks) through one or more clients 14a-14c. Each client 14a-14c may run a dedicated application to access the LMS but preferably do so using a conventional web browser. The LMS thus may be configured as a three-tiered architecture that includes a Web services or presentation tier, to manage communications with users at the clients, an application or logic tier, to provide the functionalities described herein, and a data tier, to provide storage and retrieval of information. The presentation tier includes the GUI described below which facilitates the display of information at the clients and receipt of user input in the form of commands, content, cursor navigations, etc., entered at the clients. The presentation tier communicates with the clients via the Web browsers running on the clients and passes information and commands to the other tiers of the LMS system running on server 10. The logic tier controls the functionality of the LMS by acting on information, commands, etc. received through the presentation tier, and business and data rules that are designed to maintain data structures (the storage into and retrieval out of which are managed by the data tier) consistent with the facilities described below. The present LMS thus provides a portal where users can create and interact with project courseware.

Before describing aspects of the present LMS in detail, it is helpful to define terms that will be used in that description. Within the context of the present LMS, a "project" or "course" is a defined unit of learning and (usually) doing undertaken by a student (a "learner") and designed by a course creator to meet certain objectives. For example, a course may be designed to teach a specified subject matter and have the student perform certain tasks in furtherance of that goal, for example as an application of the knowledge just learned and/or as a way of accumulating skills encompassed by or attendant to the subject matter. While much of the following discussion will be presented in the context of "courses," it should be recognized that the individual learning resources that can be included within courses may also stand alone and be explored, e.g., via maps, by learners and teachers. Accordingly, embodiments of the invention may be regarded as resource centers.

A "learning path" is, in one sense, an ordered set of lessons through which subject matter of one or more courses is taught. The ordering may be in one, two, or more dimensions. For example, lessons may be arranged in sequence both horizontally and vertically, as displayed in a map, where lessons arranged in a common horizontal tier are intended to be completed in sequence from left to right, and all lessons in a tier placed vertically above a subsequent tier are intended to be completed before the first lesson in that subsequent tier is commenced. This order of completion may, but need not necessarily, be enforced through attributes associated with the lessons which automatically check for completion of required prerequisites (e.g., as demonstrated or recorded in a student profile) before allowing a student to commence a selected lesson. Similar enforcement mechanisms may be used for projects as a whole, where certain prerequisite knowledge is required before undertaking a particular project. More generally, a learning path may be a set of lessons/learning resources that are organized in a particular visual arrangement with respect to one another and which can be engaged in an interactive fashion. Where the learning resources are represented as blocks (as discussed further below), the color and shape of the blocks provide visual clues for the user as to the purpose of each block and how they relate to one another.

As used in the context of a learning path, a "lesson" is a unit of information transfer concerning one or more specified concepts or skills. Some "lessons" are general in nature, while others are specific as to their subject matter. Learning paths also include "mediums," which are materials that may be used in the course of completing a project, for example either to produce certain deliverables or to reinforce subject matter concepts of more general lessons. A medium often will have dedicated subject matter for a student to learn in order for the student to be able to employ the medium. For example, a toy robot which a student may program to perform various activities will have a defined set of commands which the student must learn. Therefore, while a lesson in the learning path may be designed to teach aspects of programming generally, a dedicated medium module within the learning path may be provided to teach the student the command set for the toy robot in particular.

Finally, learning paths also may include one or more deliverables. These are work product items which the student is expected to complete in order to demonstrate understanding of the subject matter taught as part of the course, and, optionally, to share his or her creations with others. As discussed in greater detail below, when a course designer creates a new course (whether from scratch or by first cloning and then modifying an existing course), the designer specifies the learning path by grouping and sequencing the lessons, media, and deliverables associated therewith in the context of a project. The lessons, mediums, and deliverables are all examples of the learning resources referenced above, some of which may have embedded actions that allow a learner's work to be compiled into a final work product.

The present LMS also employs a "badge" system. Badges are graphical representations of skills and lessons that can be earned by students through completion of the associated course materials. Badges may be linked to lessons, media, and deliverables so that as a student completes a lesson, learns how to use a new medium, and/or completes a deliverable, the associated badge is added to the student's profile with a "badge map." Badges not yet earned, but associated with courses that the student is presently enrolled in may be shown in the student's badge map as greyed out or otherwise rendered so as to indicate they have not yet been earned. Badge maps organize a student's skill/knowledge in a highly graphical and colorful manner and allow a teacher, parent, or other individual to gain an immediate appreciation of the student's knowledge across a variety of subject matter areas and the level or depth of that knowledge in each particular subject matter area at a glance. Badge maps may also be associated with projects so as to provide a visual indication to students of the subject matter areas and skills that will be taught as part of a course. More details regarding badges and badge maps is provided below. Badges may also be interactive objects with associated hyperlinks that allow users to directly access relevant subject matter (e.g., a lesson) by selecting (e.g., clicking) the badge.

At various times, the following description may refer to a user or users. Depending on context, a user may be a teacher, a student, a content creator, or other individual that makes use of the LMS of which the present GUI is a part. As with other facilities provided via cloud-based servers, etc., users are provided log-in credentials for presentation when seeking access to the LMS. Users may be categorized by membership level, and that membership level may determine facilities accessible to a user. For example, users who pay for full membership may have access to all facilities, while those that join at lesser tiers of membership may be precluded from access certain facilities and/or content. Also, users may be participants in larger "communities" or groups of similarly situated users. In some instances, communities may include users of different tiers of membership.

Figure 2:
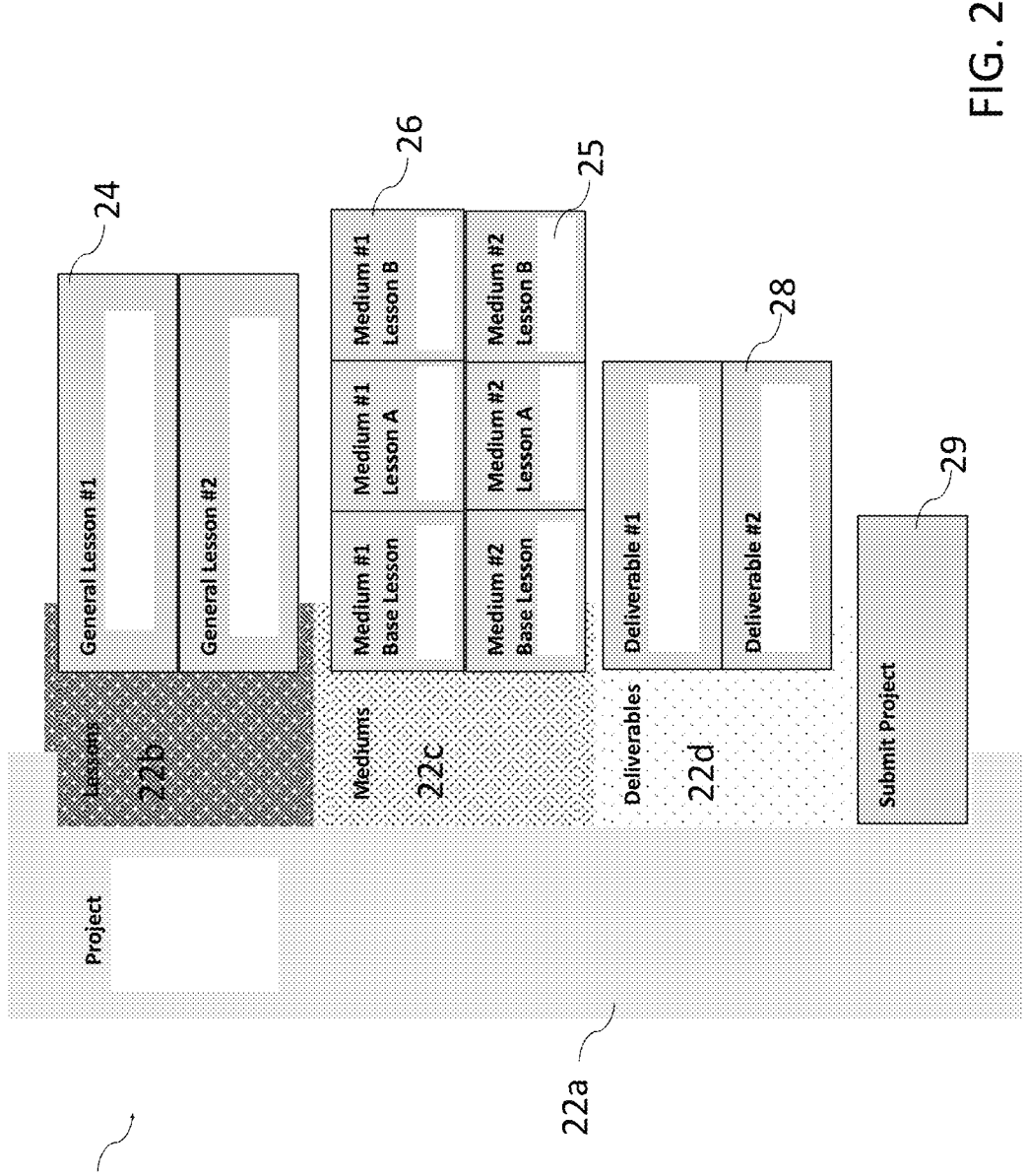
FIG. 2 illustrates an example of a learning path framework, which is a component of the present GUI.

With the above in mind, reference is now made to FIG. 2, which illustrates an example of a learning path framework 20. Within this framework, a project is represented by a project prompt 22a, in the form of a brace or clamp. This brace, and others 22b, 22c, and 22d, like it for lessons, media and deliverables, respectively, act as anchor points for a course developer creating the learning path within a course creation workspace. Other braces or clamps may group sets of lessons and/or other learning resources together. For example, such braces or clamps may be used to group categories of related learning resources together to organize same, for example, where a content creator has specified that such learning resources should be taught together.

In the illustrated example, the project prompt 22a acts as an anchor point for the lessons, mediums, and deliverables braces 22b, 22c, 22d, which act as respective anchor points for blocks that represent lesson modules 24, medium modules 26, and deliverable modules 28. Generally, for each project prompt 22a there will be a single lesson brace 22b, a single medium brace 22c, and a single deliverables brace 22d, although for any given project the inclusion of any one or more of the lessons, mediums, and deliverables braces is optional. That is, projects may have any combination of lessons, mediums, and deliverables, including none of any one or two of these categories of content items. Further, each lesson brace, mediums brace, and deliverables brace may be populated by any number of respective blocks representing lesson modules, medium modules, and deliverable modules. As indicated above, the blocks representing lesson modules, medium modules, and deliverable modules may be organized both horizontally and vertically within a respective brace, indicating a suggested or, optionally, mandatory, path of completion of the subject matter represented by those blocks.

When the project creator has completed assembly of a project, the project creator can submit it for inclusion in a database of projects. This may involve a vetting process by the operator of the LMS. The submit project block 29, when selected by the project creator, automatically fills in fields and auto-embeds media elements as part of a project submission. The project creator may be given the opportunity to edit or add to this automated submission, for example by including additional information about the project and one or more tags that pertain to it. When the project has been submitted and added to the database, it is searchable by those elements. Submitting a project also associates the learning path with the project so that other users can take the same path to create a similar type of project, or clone the embedded learning path and subsequently rearrange the components thereof or add in additional elements for a different journey.

Figure 18:
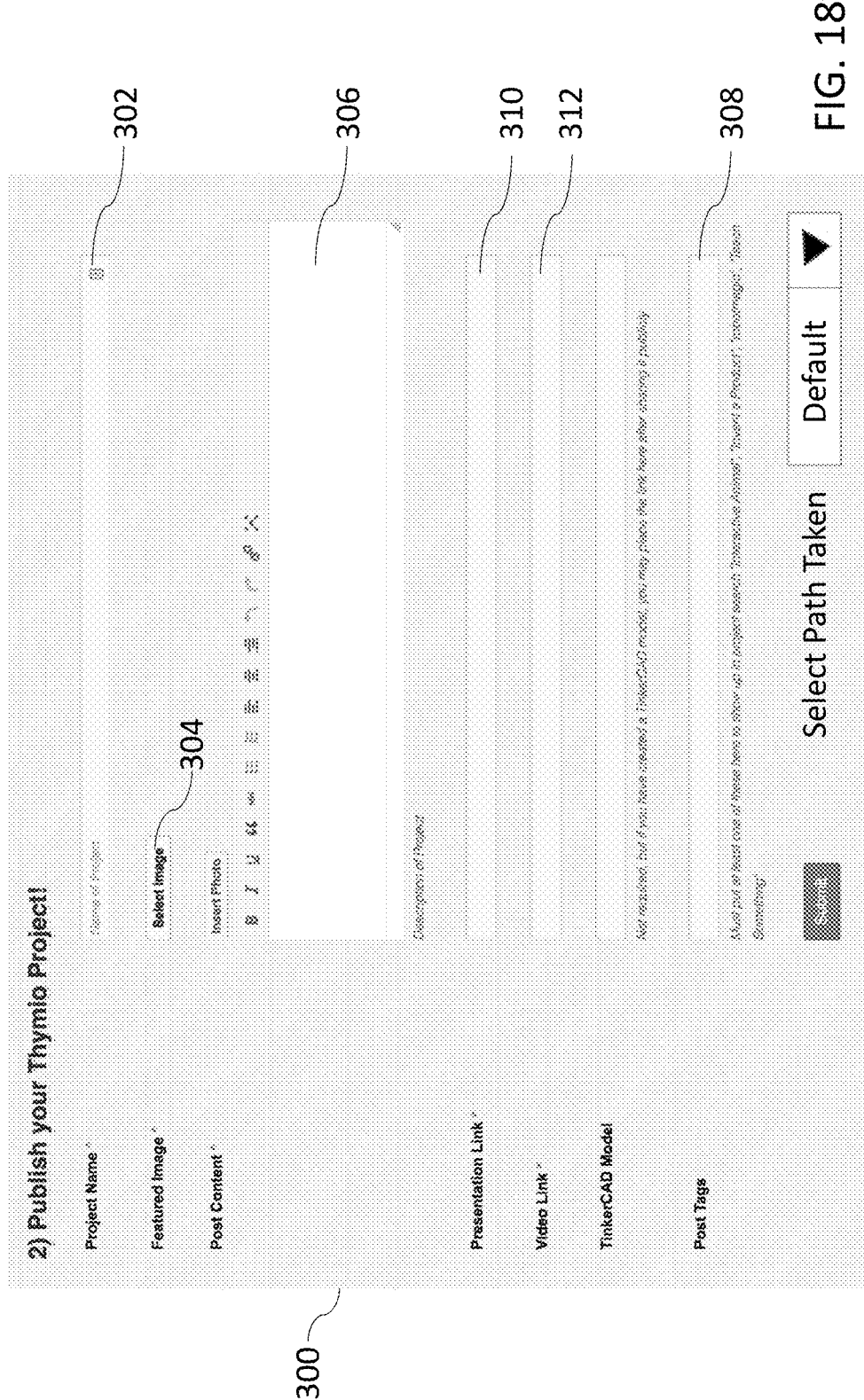
FIG. 18 shows an example of a project submission page according to an embodiment of the invention.

FIG. 18 shows an alternative project submission page 300, which a project creator may complete to publish project elements into its own project page. Projects are identified by name 302 and associated images 304, which images will become associated with badges representing the project, as discussed below. A description 306 and tags 308 relating to the project may be provided. So too may links to presentation 310 and videos 312 discussing the project be included.

FIG. 3 illustrates an example of the learning path framework 20 displayed within a course creation workspace 30, part of the present GUI 32 for an LMS. The GUI 32 is displayed on a display 34 associated with a client, such as client 14c in FIG. 1. GUI 32 is part of the presentation layer of the LMS discussed above.

The course creation workspace 30 within GUI 32 includes a visual editing facility allowing a user to assemble the course represented by the learning path framework 20 through drag and drop interconnection of blocks representing selected and compatible ones of the lesson, medium, and deliverable modules within the defined lesson, medium, and deliverable regions (braces) of the project prompt. An action menu 33 is provided with selectable options for a user to provide a title for the course being crested, save his/her work, and create the course (e.g., submit it for inclusion in a database) once complete. Other actions may also be facilitated through such a menu.

The project prompt within which the learning path is defined is a visual instantiation of learning goals. These goals may be associated with an educational standard or other reference source for the subject matter materials that makes up the educational content of the project. For example, individual lessons within a project may be tied to defined items of an educational standard. A collection of projects may be further associated to define a curriculum. The standard defines what the student needs to know and be able to do, while the curriculum, through the individual projects that make it up, define how the student will learn the material. The projects, mediums, and deliverables of each project define the learning path for that project and the learning path framework 20 of the present GUI provides a visual representation of that learning path.

The project prompt may also be associated with a rubric that is used to define various levels of mastery of the project. This rubric then can be used by the community of users and developers to rate projects and also score the ability of the project prompt and associated lessons (course) at providing a quality learning experience for students in achieving learning goals. Separate rubrics, one for project outcomes and another that scores the course by teachers, may be used. So too may a cumulative project score be provided.

Figure 3A:
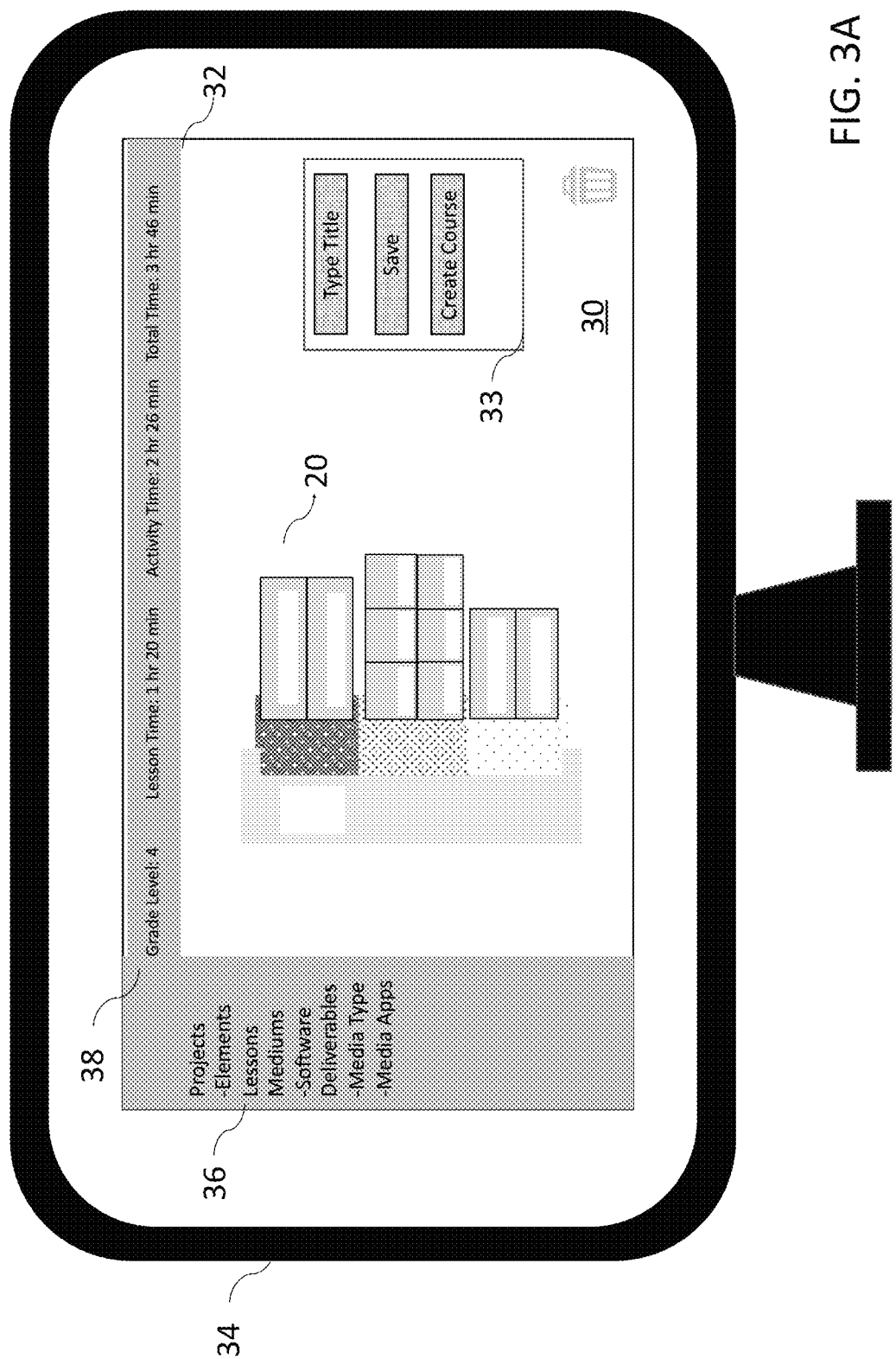
FIGS. 3A and 3B illustrate examples of a learning path framework displayed within a course creation workspace, part of the present GUI for an LMS.
Figure 3B:
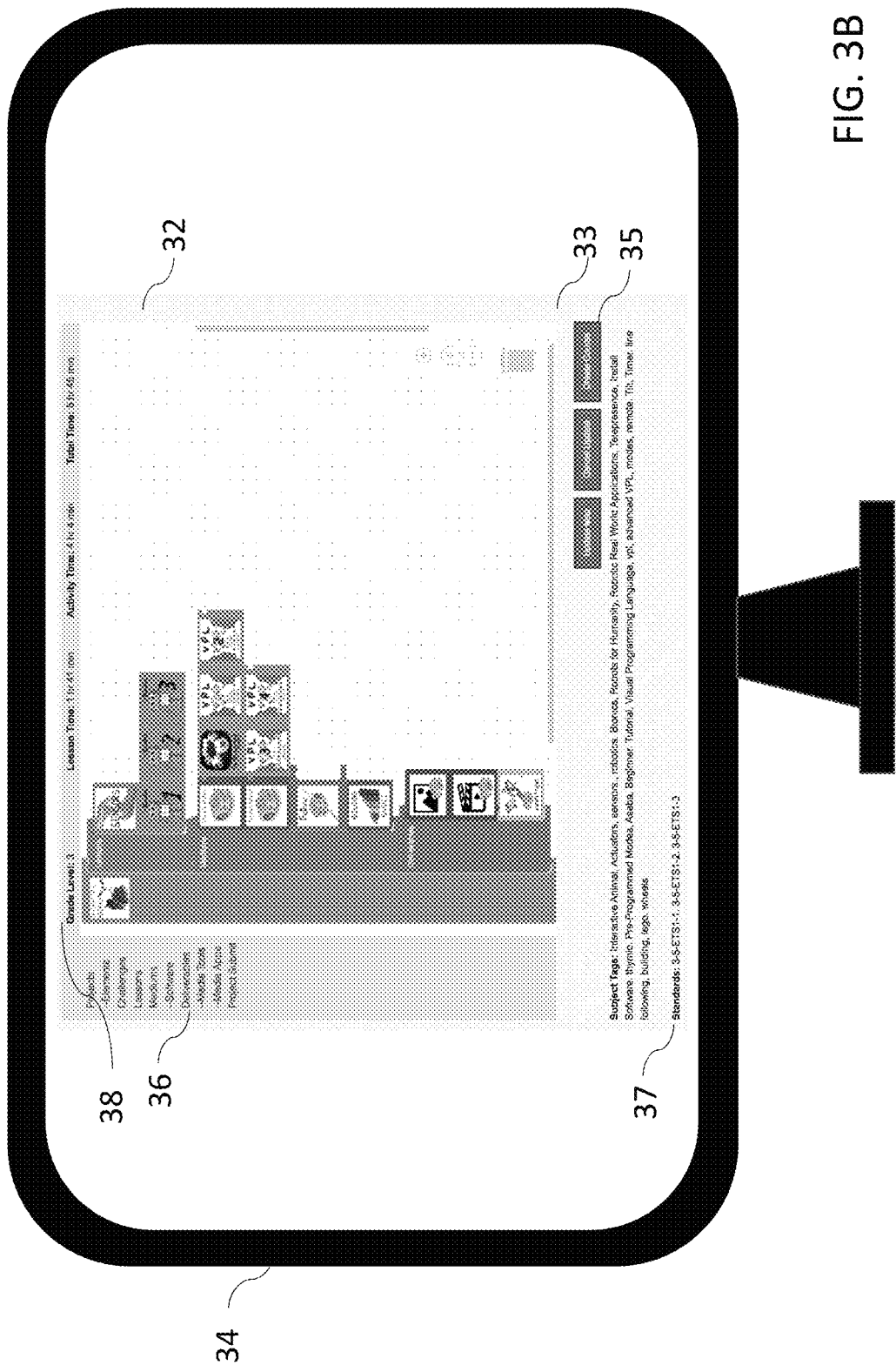

As illustrated in FIGS. 2, 3A, and 3B, the project prompt and the blocks representing the individual lesson, medium, and deliverable modules have placeholders 25 for graphical images. These graphical images will be the same images associated with badges representing the skills and/or knowledge attained by the student through completion of the lessons, media, deliverables, and project. As further described below, the drag and drop assembly of a project automatically associates badges representing the lessons, media, and/or deliverables included therein as those lessons, media, and/or deliverables become associated with the project prompt. The badges become available to students, e.g., are automatically associated with and/or included in student profiles, as the students complete the respective lessons and/or complete instruction associated with the media and/or deliverables.

Returning to FIG. 3A, a menu 36 is adjacent one boundary of the course creation workspace 30, and allows user navigation among collections of the lessons, media, and/or deliverables modules. An information ribbon 38 is adjacent a second boundary of the course creation workspace 30, and displays a minimum suggested grade level for the project and projected teaching times, activity times and total times for course material represented by those of the modules assembled within the course creation workspace. These projected teaching times, activity times and total times are automatically updated as various ones of the modules are associated with and dissociated from the project prompt through drag and drop actions of the user; that is, as the various ones of the modules are included in or removed from the learning path that defines the project.

The graphical representations of ones of the lessons, mediums, and/or deliverables of a project are each interconnectable with others thereof. For example, the blocks representing these modules may have boundaries that permit such interconnection (much like jigsaw puzzle pieces), with the boundary shapes being determined by attributes of the modules. For example, lesson modules may have a lesson type attribute which is represented by a lesson block boundary interconnectable with other lesson blocks, but not with media blocks or deliverables blocks. Also, in some embodiments, not all blocks of a similar type (lesson, medium, or deliverable) may be connectable together. For example, some blocks may have attributes defining prerequisites which must be completed prior to beginning study of the subject lesson, medium, or deliverable and therefor have block boundaries that permit interconnection only with blocks representing those prerequisites. In other embodiments, interconnection is permitted only with certain compatible other ones of the modules, for example where necessary prerequisites of the lesson, medium, or deliverable represented by the subject module have been or will be fulfilled, as represented by inclusion of modules representing said prerequisites within the context of the project. In general, compatible blocks representing lesson, medium, or deliverable modules interconnect with one another when moved adjacent to one another within the course creation workspace (e.g., when being associated with a particular project).

In some embodiments, multiple customized course paths can be saved through the actions menu 33. Further, each customized course path may be assembled as a course using the "Create Course" option in the menu. Creating a course in this fashion instantiates an enrollable course which students can register for. On an associated course homepage, the newly assembled learning path will be embedded, and the associated blocks made actionable so that selecting (e.g., by mouse clock) a respective one of the blocks will open the associated lesson. In addition, the related badge map is automatically generated and embedded in the course homepage. Blocks represented in the badge map are likewise made actionable so that selecting a respective one of the blocks will open the associated lesson.

FIG. 3B shows an alternative embodiment of the present GUI 32. In this example, the action menu 33 is provided outside the course creation workspace. Additionally, a tag field 35 is provided, which shows tags associated with blocks that have been made part of the subject course. Further, a standards field 37 is provided, which shows the educations standards associated with blocks that have been made part of the subject course.

Figure 4A:
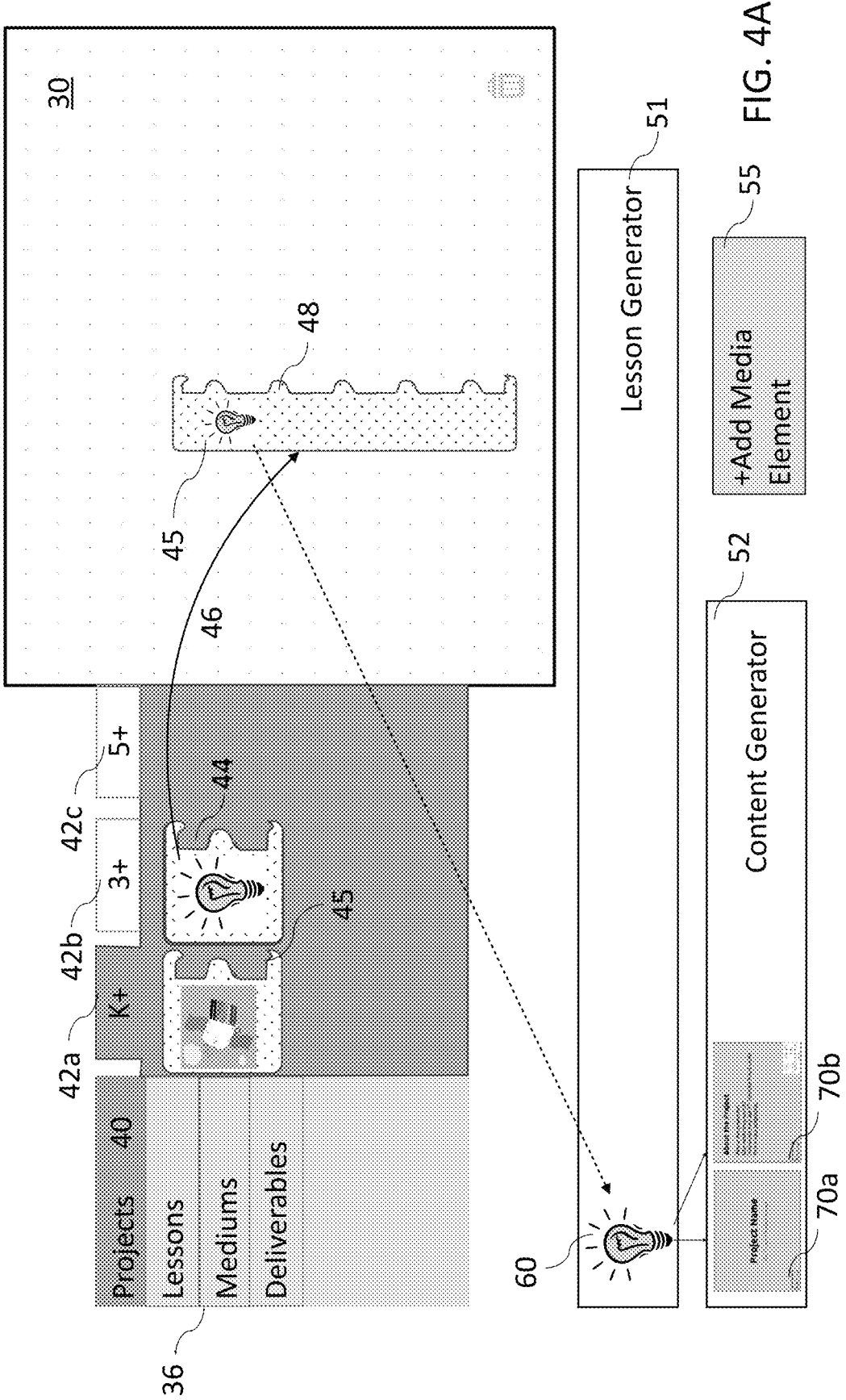
FIGS. 4A-4D illustrate steps in an example of drag and drop assembly of a project within the course creation workspace of FIG. 3.

An example of the drag and drop assembly of a project within the course creation workspace 30 is illustrated in FIGS. 4A-4D. In FIG. 4A, a portion of the menu 36 is shown. In this example, the projects tab 40 has been selected, making various projects available for selection by a user. As shown, the projects may be grouped, e.g., on individual tabs 42a, 42b, . . . , 42n, according to suggested grade level. In the illustration, projects deemed suitable for kindergarten students have been selected. A particular project has been selected by a project creator and the block 44 representing that project has been dragged 46 (e.g., through user manipulation of a selection tool such as a mouse or trackpad) into the course creation workspace 30, where it is now instantiated as a project prompt 48. Notice that the project is represented by a graphical image 45. This same graphical image will be associated with a badge for the project such that when a student has completed the project, the project's badge will be added to (or highlighted within, if it already appears within) the student's profile.

As represented in FIG. 4A, the drag and drop actions that take place within the course creation workspace 30 cause a lesson generator 51 to automatically create an instance of an associated project 60 within the data tier of the LMS. When block 44 was dragged and dropped into the course creation workspace to instantiate the project prompt 48, lesson generator 51 of the LMS automatically created an associated project 60. For convenience, the project 60 is represented by the same graphical image/badge as used in project prompt 48.

Furthermore, content items 70a, 70b associated with the project 60 were copied by a content generator 52 of the LMS and associated with the project 60 by the data tier layer of the LMS. In this example, the content associated with the project prompt consists of materials (e.g., presentation slide templates) that a student will complete while undertaking the activities that are (or will become) associated with the project. In general, any kind of media that a student may need to submit or create as part of the project may be included as content items, such as audio-video presentations, reading materials, programs, 3D models, etc. So too may additional media items be added 55 to the template materials associated with the blocks introduced into the learning path in course creation workspace 30.

Lesson generator 51 may be regarded as a learning path generator, within which a learning path for the project is automatically created as ones of the modules are associated with and dissociated from the project prompt 48. The learning path is represented by respective graphical images 60, etc., which correspond to respective blocks that visually represent respective ones of the modules associated with the project. In addition, content or presentation generator 52 provides a facility within which presentation objects associated with ones of the modules are automatically created and organized in sequence, as modules are associated with and dissociated from the project. Additional customizations, such as editing, rearranging, or deleting existing media elements and adding new media elements, etc. can also be done via the content generator.

Figure 4B:
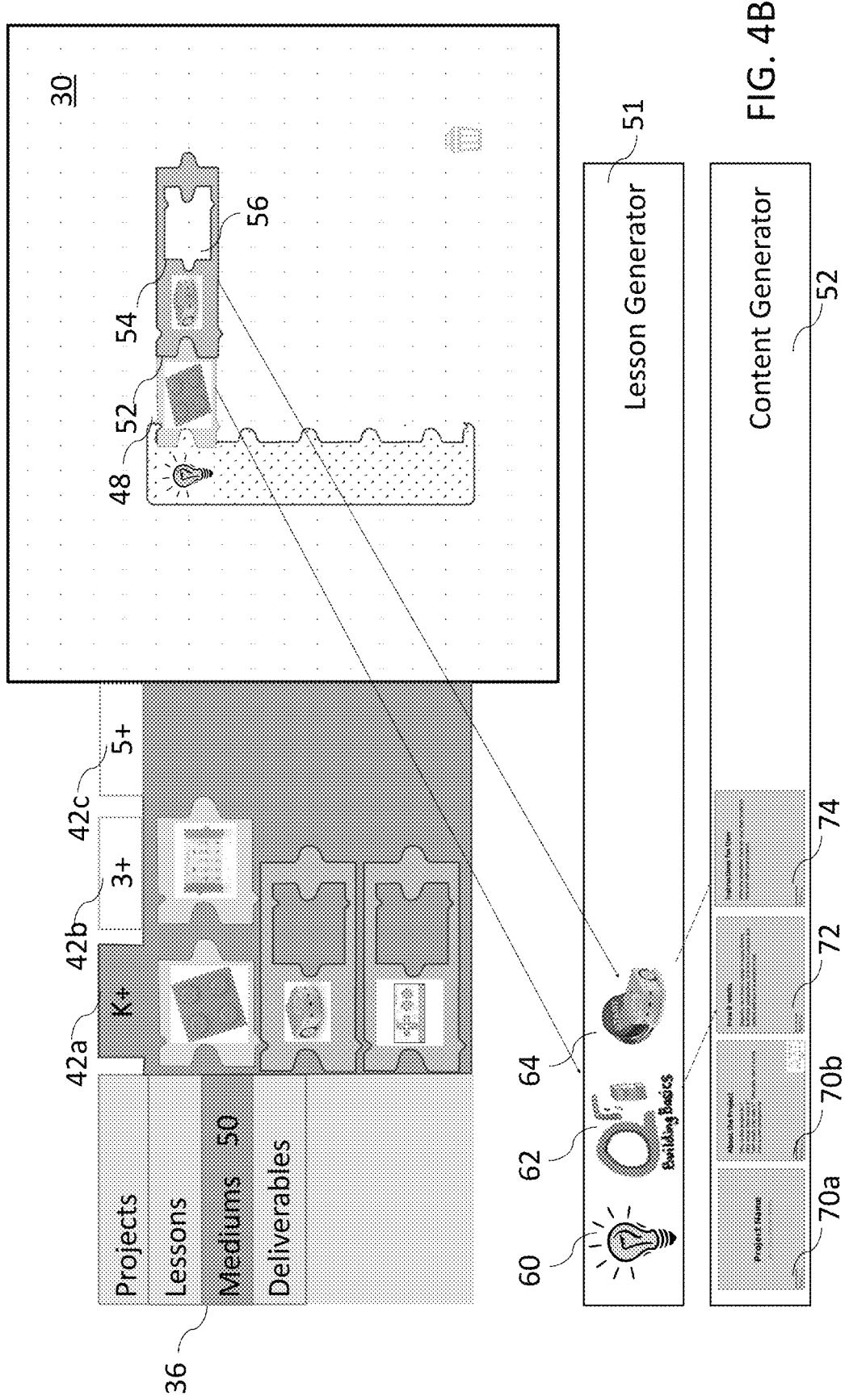

In FIG. 4B, the project creation process has continued. Within menu 36, the mediums tab 50 has been selected, making a variety of medium modules available for selection. As with the projects, the mediums modules may be arranged on different tabs, according to grade-level or another designated category. Within the project creation window 30, blocks 52 and 54 representing different mediums have been dragged into position within project prompt 48, and corresponding lessons 62, 64 and content items 72, 74 (which may have been previously associated through tags or other relevancy indicators) have been associated with the project. Although not illustrated in this figure, individual braces for lessons, mediums, and deliverables may be employed within the lesson framework in the course creation workspace.

Figure 4C:
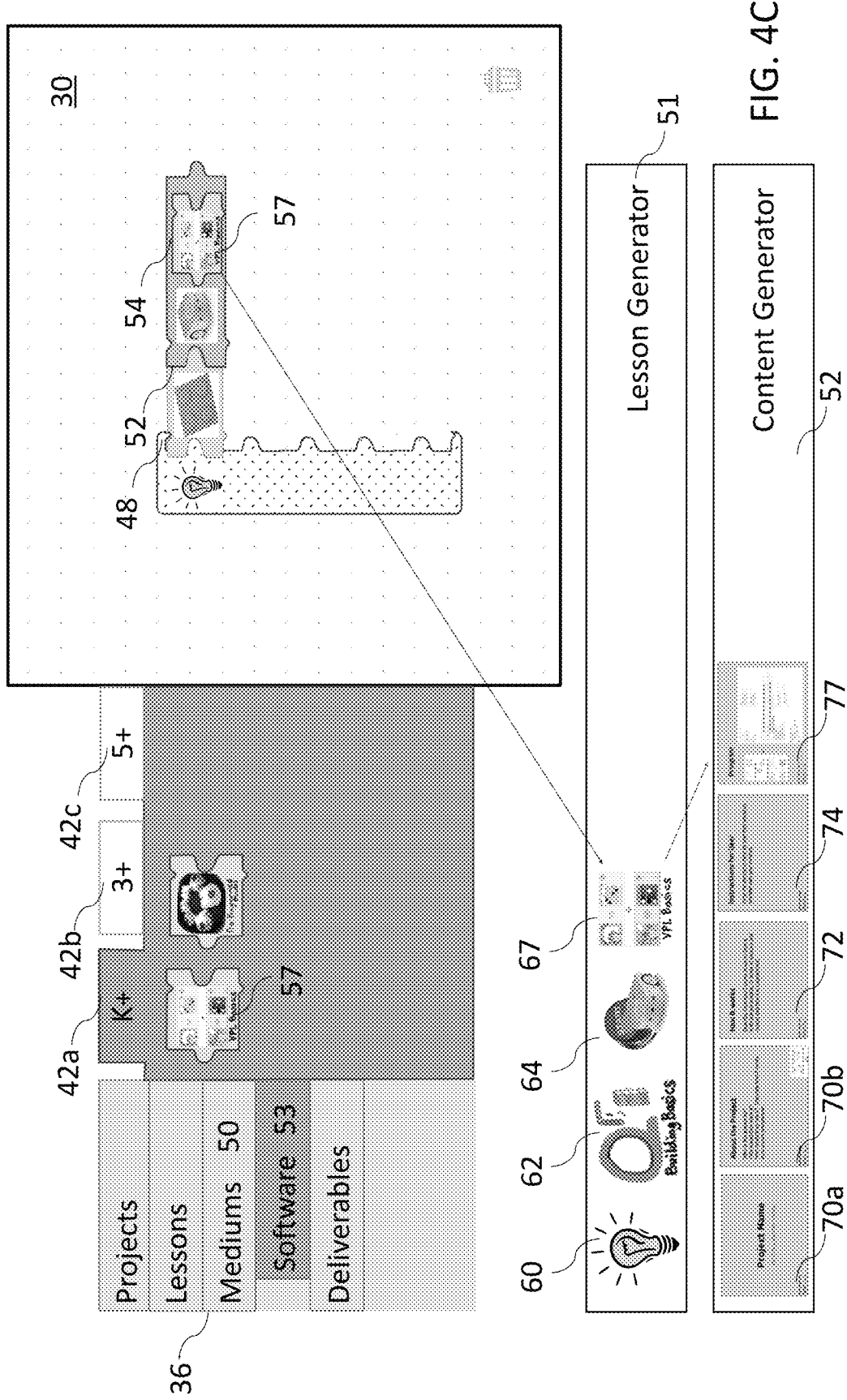

Notice that block 54 representing a medium module includes an open receptacle 56. This is an indication to the project creator that certain content should (optionally, must) be included with this medium module; for example, instructions for using or working with the associated medium, an associated programming language or framework, etc. As shown in FIG. 4C, content modules available for inclusion in receptacle 57 are presented in a sub-tab 53 for software. This is because the associated medium is a programmable object. Block 57, representing basic programming instruction appropriate to and required for use of the associated medium has been selected and moved into position within block 54 in the project learning path. As this was done, the associated lesson 67 and content 77 were generated.

In the context of this project creation, the lessons and content items are generated in the sense that existing objects representing the lessons and content are replicated and stored in association with the subject project. Or, alternatively, rather than being replicated in their entirety, appropriate pointers or other indicators to the lesson and content objects may be created and stored in association with the subject project. These objects will have been previously created and, hence, are available for selection and inclusion in a project. In other instances, lessons and the associated content may not yet exist and so will have to be created before they can be included in or associated with a project. The present GUI facilitates such creation, as will be discussed further below. Moreover, once generated users have the option to move, add, rearrange, and modify the content as desired from their own instance of a generated learning path/course.

Figure 4D:
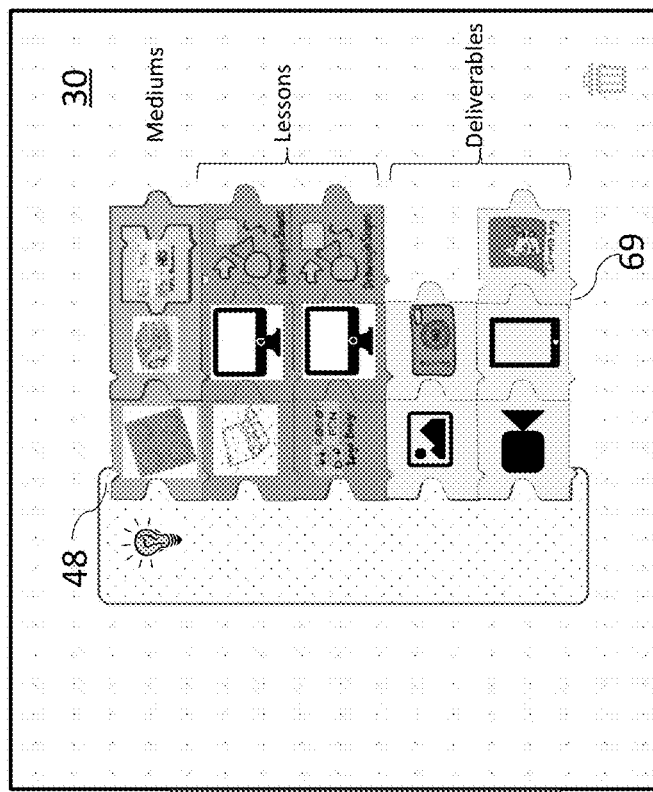
Figure 4D:
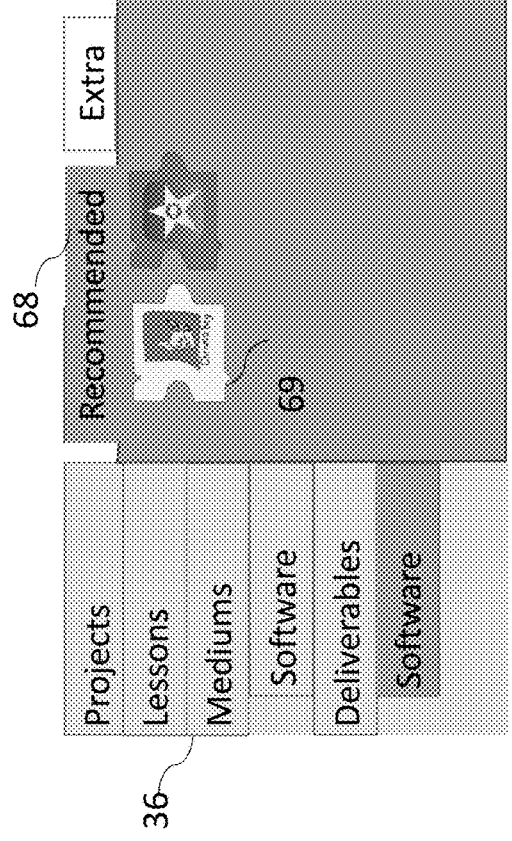
Figure 4D:
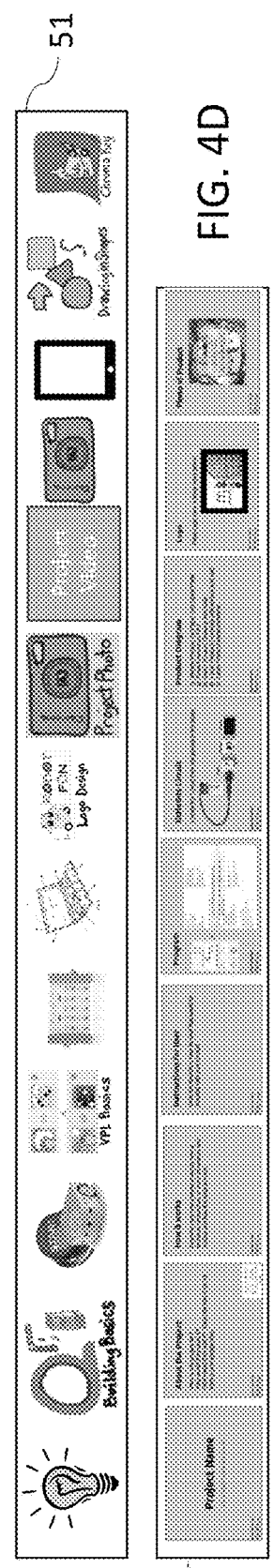

FIG. 4D shows a completed learning path framework for the project. The project includes a number of lessons, mediums, and deliverables modules, each represented by blocks in the learning path framework. Menu 36 shows that some recommended deliverables 68 were available for inclusion in the project, and, as indicated in the course creation workspace 30, a block 69 shows that a recommended software deliverable module was so included.

Figure 4E:
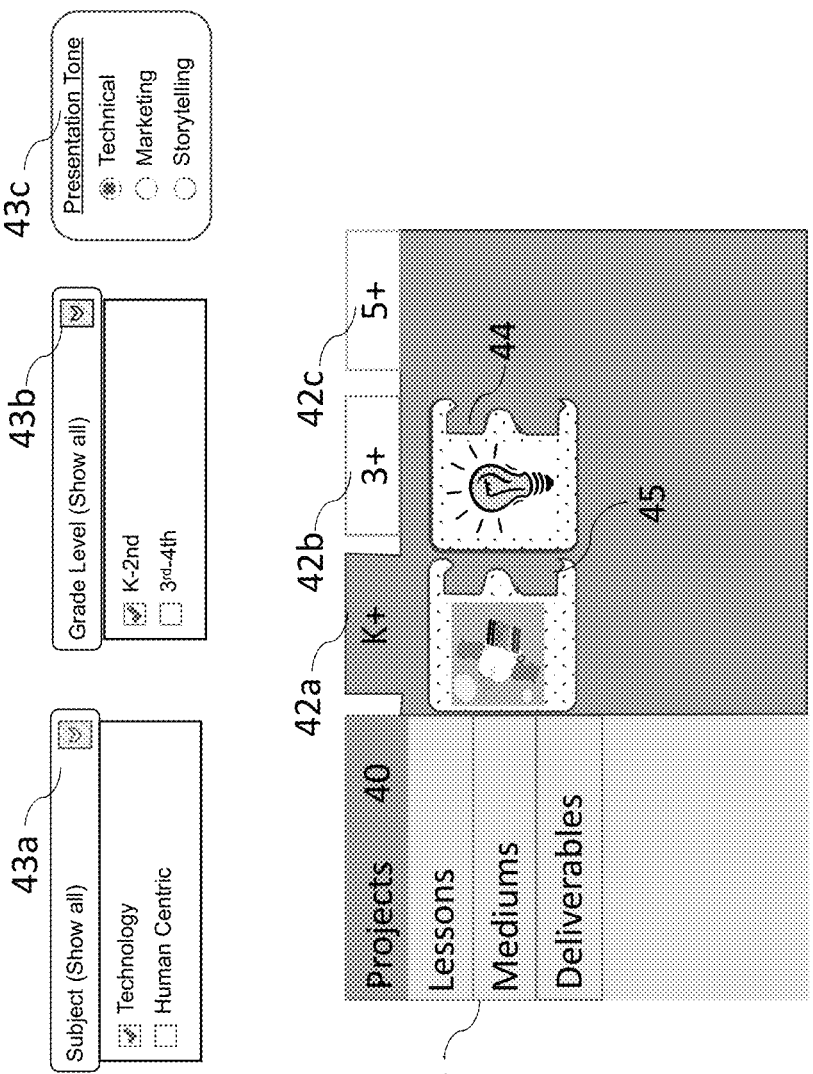
FIG. 4E illustrates an example of filtering of menu items for a learning path framework, in accordance with an embodiment of the invention.

When a new project is being created, or during creation of a project, the menu items may be filtered through user selection of drop down menus and/or radio buttons, etc., according to one or more categories. For example, menu items may be filtered, as shown in FIG. 4E, according to subject 43a, suggested grade level 43b, suggested age (of student), presentation tone (e.g., technical, marketing, storytelling, etc.) 43c, or other categories. Also, the menu items may be organized (e.g., by tab) according to suggested age or grade level (of the student), subject matter (e.g., craft, program code, and application), mandatory, recommended, or optional, etc. User navigation via the menu and/or module availability within the menu may be restricted according to one or more of: user type, user role, user group, and user enrollment. For example, profiles associated with users of the present LMS may be tagged according to user type, role, group, and/or enrollment or licenses, and these tags may be read in order for the system to determine whether or not to make available to a given user certain modules for selection. Premium modules, for example, may be made available only to those with the most permissive licenses, while those with restricted licenses or those who have not completed certain training courses may be permitted to select only basic (e.g., freeware) modules.

As each module is added within a project, the items displayed in ribbon 38 (e.g., suggested grade level, lesson time, activity time, and total time) are updated. This is made possible by associating these metrics with the modules (e.g., as metadata) and then reading the associated metrics and computing the respective times, grade levels, etc., as the modules are added. For example, is a module appropriate for first grade students having an associated teaching time of 2.5 hours is added to a project that has kindergarten-level modules totaling 30 minutes of teaching time, then ribbon 38 would be updated to indicate a suggested grade level of Pt grade (i.e., the grade level associated with the most complex of the modules currently present in the project), a lesson time of 2.5 hours (the time associated with the lesson being added), and a total time of 3 hours (the total of all modules currently included in the project).

Figure 5:
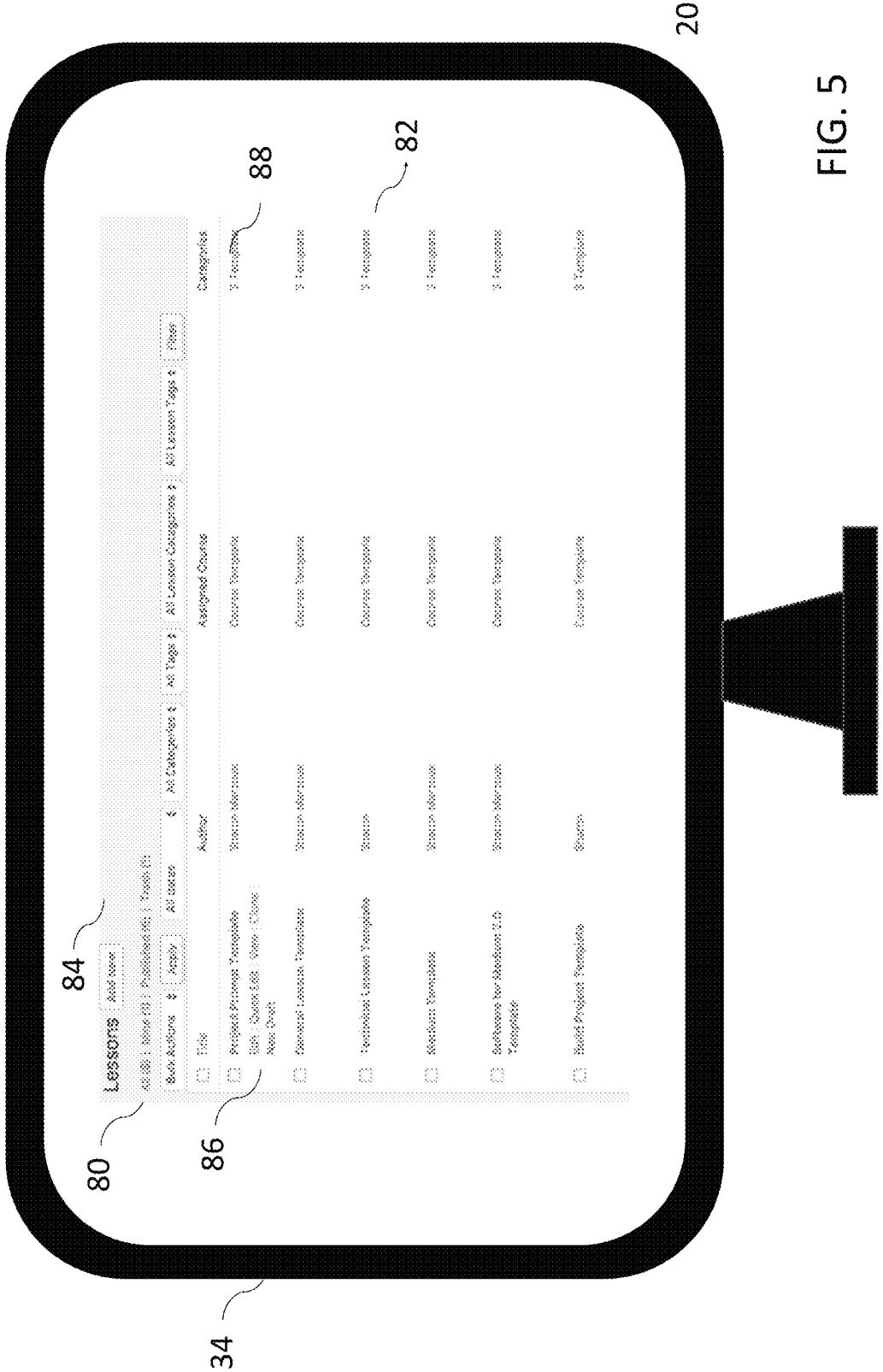
FIG. 5 illustrates an example of a GUI screen showing a list of available lessons within an LMS system, in accordance with an embodiment of the invention.

As mentioned above, in addition to allowing creation of projects from existing lessons, mediums, and deliverables, the present GUI also allows creation of new lesson, medium, and severable modules. FIG. 5 illustrates a screen 80 presented on display 34. Screen 80 shows a list 82 of available lessons within the LMS system. In this example, the list is displayed in row and column format, but other formats, such as tiles, may also be used. To display such a list, a user may invoke an appropriate command from menu 36 or another facility of the present GUI. Alternatively, the user may invoke a search command, specifying that "lessons" should be retrieved. All modules tagged as a "lesson" in the data tier would be retrieved and presented. Screen 80 also includes a facility, in this case button 84, for invoking a module editor in order to create a new lesson module.

In the illustrated example, among the existing lessons displayed are templates for projects, lessons, mediums and deliverables. As an alternative for creating a new module, a user may make use of an existing template for same by selection from the displayed list. For example, if the user wished to create a new project, the user could select from among the option menu 86 associated with the "Project Prompt Template" 88. "Cloning" the existing template, for example, would create a new instance thereof, which the user could subsequently "edit" in order to create a new project prompt. Similar actions are available for lessons, mediums and deliverables using the specified, respective templates.

Figures 6A, 6B, 6C:
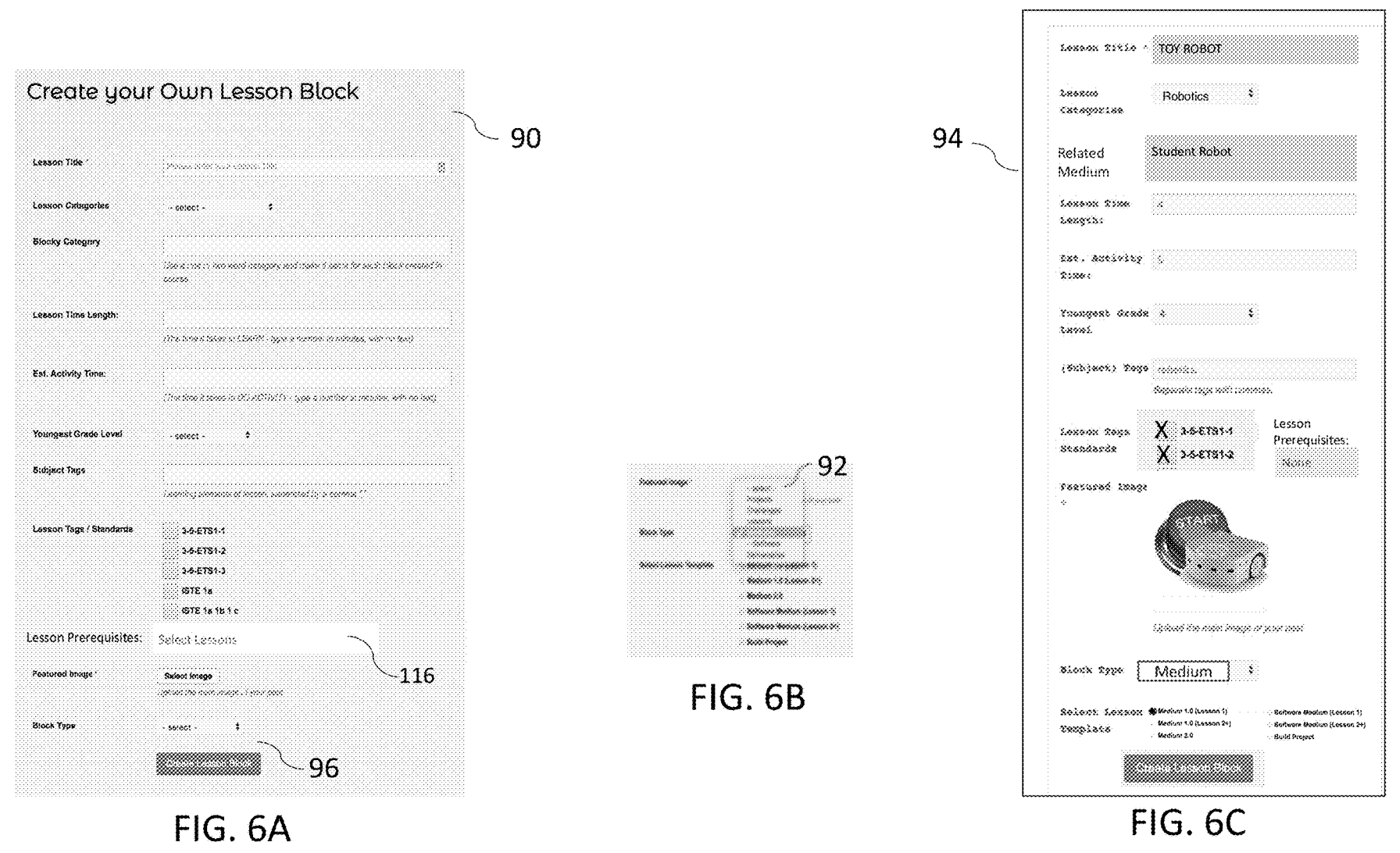

FIG. 6A shows an example of a lesson template 90. The template is used to form the shape and attributes of a block and allows a user to specify details (e.g., title, related mediums, tags, educational standards, etc.) regarding the lesson to be created, which details will become searchable metadata once the lesson has been created. Creation of a lesson adds it to the data tier, allowing it to be searched (e.g., according to the metadata and supplied tags), and included in subsequent courses. The example of the template includes facilities (e.g., text boxes, radio buttons, drop down menus, etc.) for a user to provide a lesson name, specify one or more categories to which it pertains, and provide associated lesson and activity times and suggested grade/age levels (e.g., for use with the presentations in ribbon 38).

Figure 19:
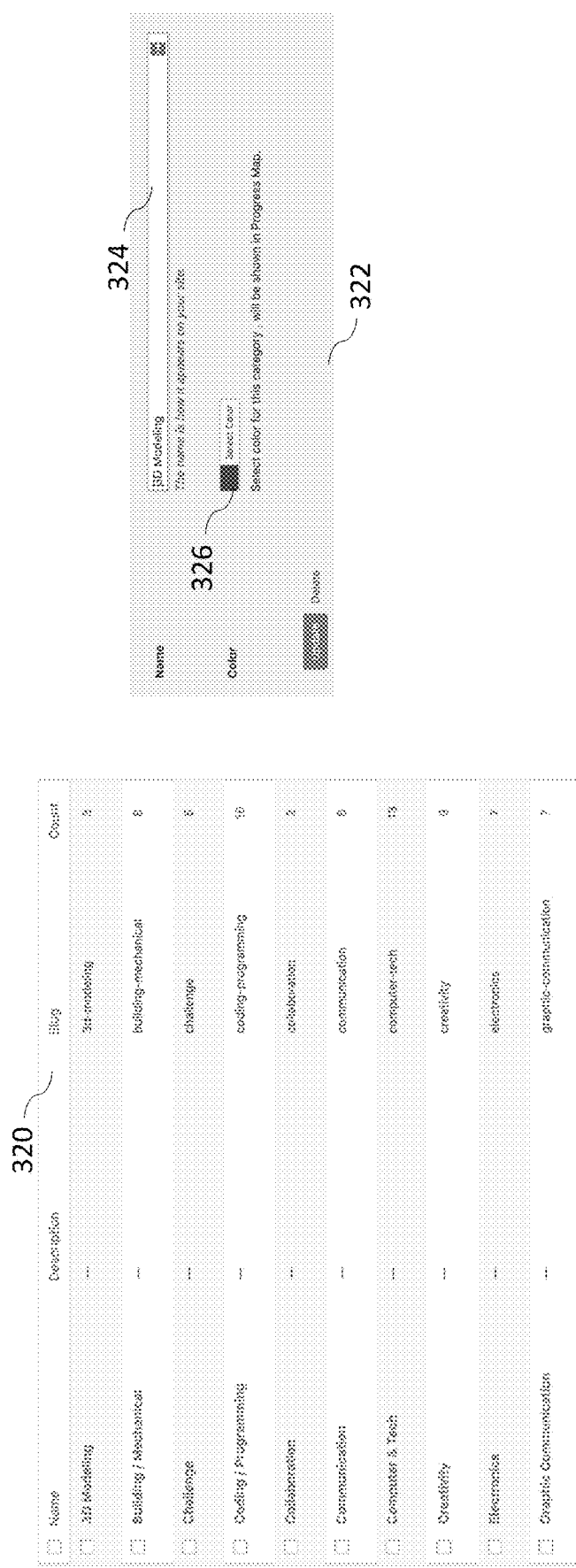
FIG. 19 shows menus for lesson categories and color coding according thereto according to an embodiment of the invention.

Lessons may be categorized by subject matter and color coded according thereto. FIG. 19 shows menus 320 and 322. Menu 320 shows a list of available categories for subjects. The menu is presented in the present GUI upon user request. Menu 322 shows how color coding may be applied to a category and lessons therein. The category is selected from drop down list 324, and the corresponding color selected from drop down list 326. Future lessons within this category will be assigned the corresponding color.

Returning to FIG. 6A, the user is also permitted to provide one or more tags—that is, short descriptions of the lesson useful for search purposes and other indexing. As illustrated, the tags may relate to certain educational standards associated with this lesson. Associating lessons with one or more educational standards in this way allows course creators to recognize when the lesson may be appropriate for inclusion in a project or curriculum.

An image is required to be associated with the lesson. This image will also become the lesson badge. Further, a lesson block type should be designated. As shown in FIG. 6B, different block types exist for projects, lessons, mediums, and deliverables, and dropdown menu 92 may be used to ensure that selection of the block type is restricted to related lesson templates. In some cases, specialized block types may be used for certain types of mediums, etc. FIG. 6C illustrates an example of a completed template 94 for a "Toy Robot" medium that relates to a Student Robot.

Once the template has been completed, the lesson may be created by selecting the "Create Lesson Block" button 96. Such selection results in creation of the appropriate records within the data tier of the LMS. In addition, the block representing the lesson is created with the appropriate shape and badging. This block will now be available for selection via the menu 36 and may also be available to other community members if the creator has indicated it may be shared with others. It remains, however, for the creator to specify the associated content for the lesson. Accordingly, an associated lesson form (e.g., a template such as that described below) is automatically opened within the GUI (in editable form) so that the creator may begin to specify that content.

Figure 7:
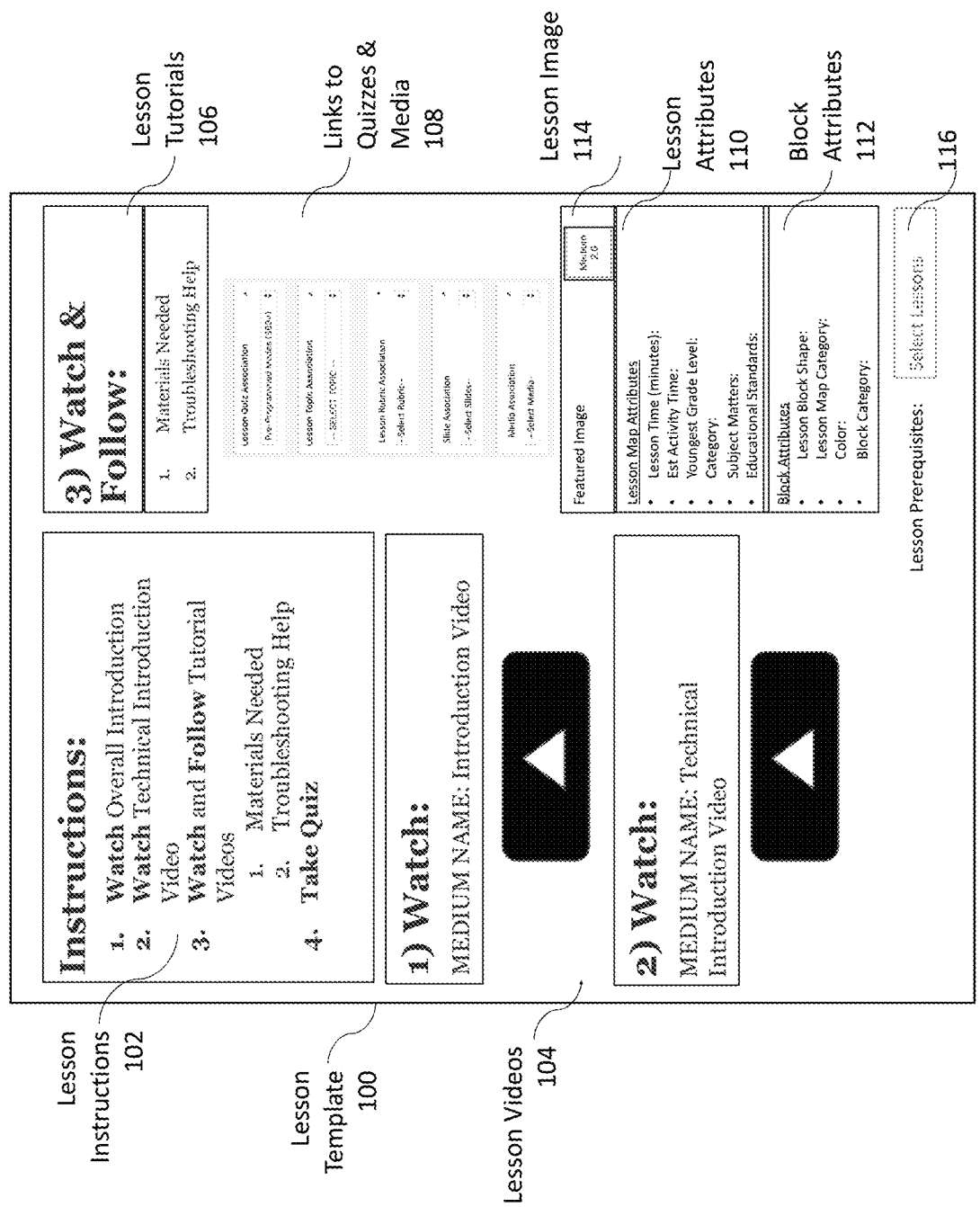
FIG. 7 shows an example of a lesson template for the present GUI.

Lesson content, much like a lesson block, can be created using a template. An example of such a lesson template 100 is illustrated in FIG. 7. In this template, placeholders are provided for lesson instructions 102, lesson videos 104, Lesson tutorials 106, and links to quizzes and associated media 108 can be specified. The lesson instructions can be customized to reflect the lesson content by editing the placeholder text in the template. If the lesson is to include one or more videos, they can be added to the template using drag and drop commands, or through selection by menus. Similarly, tutorials, which may include both video and live presentations/demonstrations, can be added to the template through drag and drop selection or selection through the use of menus. The links to quizzes and associated media 108 may be hyperlinks or embedded interactive objects to associate quizzes and other content (e.g., slides, games, coding environments, etc.) to the lesson. Lesson prerequisites may also be specified 116.

In addition to these elements, the lesson template includes various lesson attributes 110, block attributes 112, and the associated lesson image 114. The lesson attributes may be populated in the lesson template from the information specified by the user when the lesson was created. For example, lesson time, activity time, suggested grade level, lesson category, lesson subject matter, and the associated educational standards may be so populated as reference for the user. Block attributes 112 refer to the attributes of the block that will represent the lesson in the learning path and be available for selection via menu 36. Attributes such as shape (which may depend on lesson type), map category (which again may depend on lesson type and other attributes), color, and category may be specified. The block attributes are, generally, not user-definable. Instead, they are system-specified based on selections made by the user when the lesson was created. Lessons, mediums, and deliverables of various subject matters are each associated with a different color, as discussed further below. Such color assignment helps in represented a student's breadth and depth of knowledge of particular subject areas in a profile (e.g., in a badge map). Likewise, block shape, which defines a block's ability to interconnect with other blocks with other blocks, is a system-specified attributed, based on the type of block, its grade level, its subject matter, and, optionally, other attributes. Finally, the user-specified image for the lesson (which is also its associated badge), is provided as a reference. Of course, other templates may be provided and lesson template 100 is only an example.

Collectively then, the various templates are subject to editing via a module editor of the GUI which allows a user to define (e.g., via a number of attribute fields) aspects of a desired module representing a lesson, a medium, or a deliverable, add content thereto, and to provide a command to generate the desired module automatically, based on the defined aspects. Alternatively, the module may be represented as a block in menu 36 as soon as the lesson is created without the need for specific user direction.

The module editor may be selectable at least from menu 36 and may also be selected through other navigation means within the GUI. In some embodiments, the module editor is configured to allow user to revise an existing one of the modules or a template through selection of an option to edit that existing module or template. Further, the module editor may be configured to allow user to clone an existing one of the modules through selection of an appropriate option. A cloned module can then be customized as desired by updating the content, etc., associated therewith.

Figure 20:
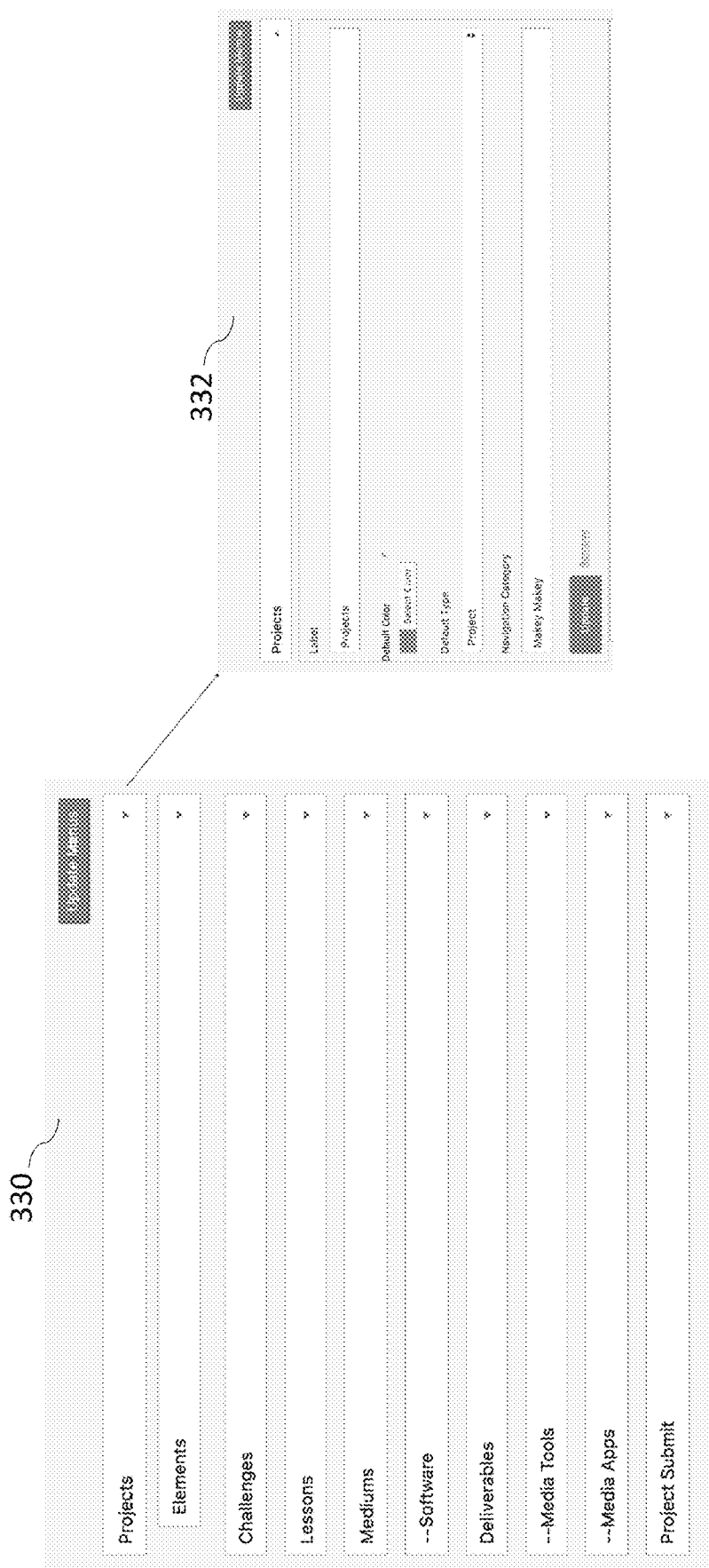
FIG. 20 illustrates an example of a menu customization interface that allows a user to personalize a menu of the course creation workspace.

In addition to allowing customization of lessons, etc., the present GUI allows customization of menu 36. As shown in FIG. 20, a menu customization interface 330 allows a user to personalize menu 36 by designating which elements appear within the menu and how they are represented therein. The customization interface 330 includes drop down lists for each menu item (projects, lessons, mediums, deliverables, etc.), which, when selected, opens a menu item customization interface 332. The menu item customization interface allows a user to specify a desired menu label, associated color, type(s) of blocks (e.g., shapes) that are associated with this level of the menu hierarchy (project, lesson, medium, deliverable, etc.), and other filterable menu categories.

Figure 8:
FIG. 8 shows an example of a badge map for the present LMS.

As discussed above, within the present GUI the lessons, mediums, and deliverables, modules are visually represented by blocks, each having one or interconnection points and a graphical image. The graphical images associated with the blocks are also used within a badge map 120, as illustrated in FIG. 8. Note that in this illustration only a small number of graphical images are shown so as not to unnecessarily obscure the drawing. Also, although the badge map is represented in grey scale, in embodiments of the invention the badges are preferably represented in colors, e.g., relative to the above-mentioned color spectrum over which all of the available subject matter areas are color coded.

The badge map is a collection of badges; that is, visual representations of student achievements or skills. Each badge may have a respective graphical image which corresponds to the graphical image of a respective block that visually represents a respective one of the modules. The badges may be organized by type (e.g., subject matter) and required skill level of the modules to which the corresponding badges pertain.

To create the badge map, lesson categories are defined and assigned a color within the overall spectrum. Lesson categories that are deemed closely related to one another in terms of subject matter are placed in close proximity to one another within the badge map and, hence, in color. Color assignments may be made per category, as discussed above. Badge maps may be displayed on a per-project, per-student, or another basis. A project badge map may show the badges associated with the lessons of the project, arranged in subject matter columns and in rows according to the sequence in which the lessons are to be completed. Profile badge maps may show badges arranged in subject matter column in order of completion by the student.

The badge map is a form of data structure that provides advantages of the present LMS over previous systems. Organization of badges along multiple axes such as shown in the illustration allows for visual representation of breadth and depth of a student's knowledge/skills when the badges are incorporated in a student profile. Further, in some embodiments of the invention, blocks representing lessons, mediums, and deliverables may be selected from the badge map, as displayed on a display, and dragged and dropped into a lesson framework in the process of creating a project. This avoids the need or use of a menu such as that described above and for some course creators may represent more intuitive way to design and construct a course. A single badge map such as 120 may be used to store and represent all of the blocks representing all of the lessons, mediums, and deliverables available through the present LMS. Of course, it may not be possible to represent all of these items in a single view on a display, so when displayed the badge map may be navigable in two or more dimensions. Also, at some levels of magnification, it may not be feasible or desirable to show individual graphical images representing the lessons, mediums, and deliverables, and so the individual blocks may be represented by color and/or shading only.

Figure 9:
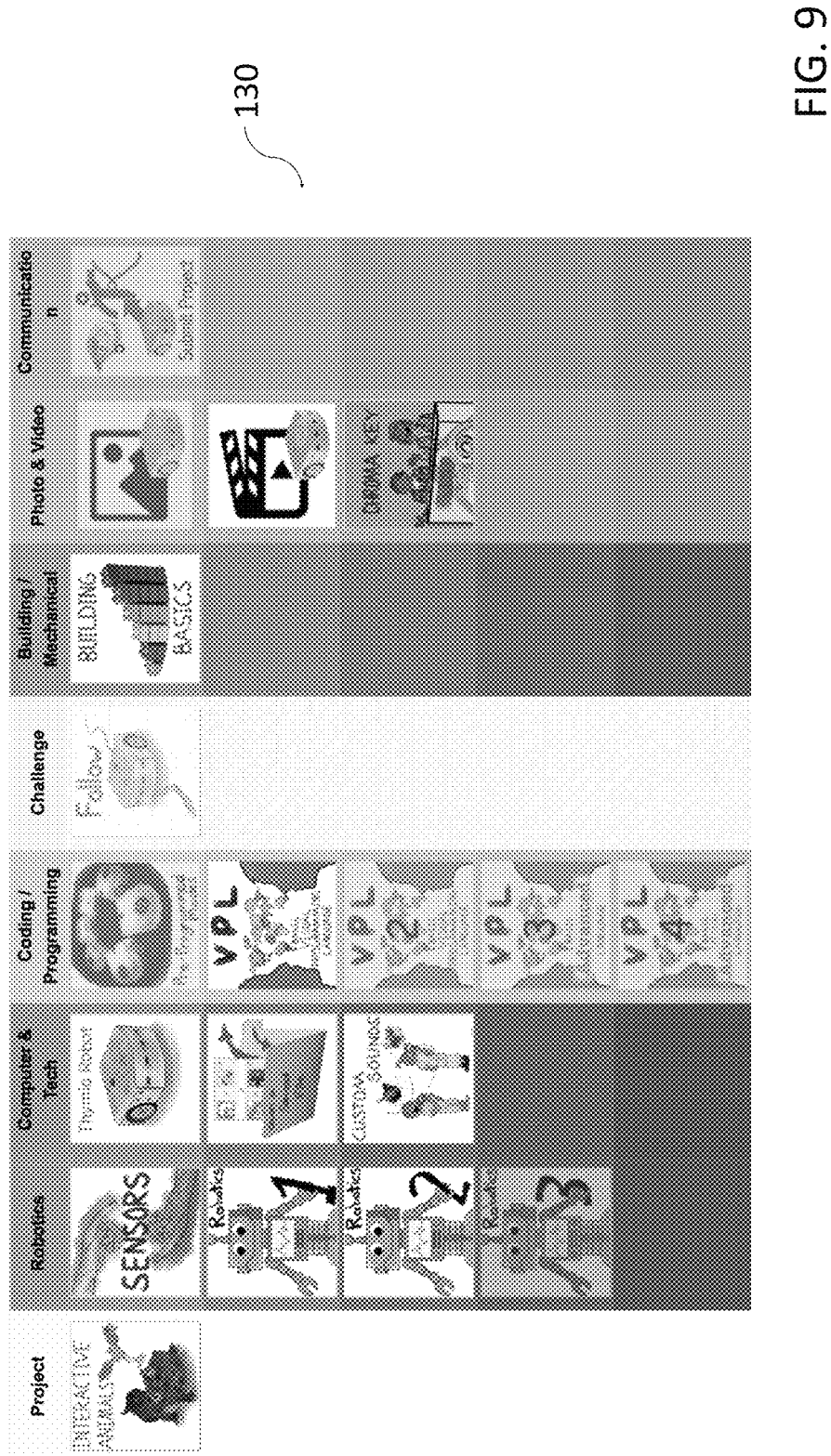
FIG. 9 shows an example of a student profile badge map for the present LMS.

In addition to the overall badge map 120, the present GUI may also include student profiles. Each profile may be associated with a respective student, and each may include a student badge map 130, illustrated in FIG. 9, in which a collection of badges, such as those described above, is displayed. Within a student profile, badges may be organized by type (e.g. subject matter), as represented by color/shading, and required skill level of the modules to which the corresponding badges pertain. Transparency of badges may be used to represent the grade level or other measure of the depth of knowledge associated with a particular subject matter. Alternatively, or in addition, badges may be organized by subject matter and order in which they were completed. Badges represented in a profile may be representative of lessons, etc., which have been completed by the respective student. Further, badges associated with yet-to-be completed lessons, etc., may be included in a profile but indicated in a fashion (e.g., grayed out, shown in dashed outline, etc.) so as to indicate their inchoate nature.

Different filters can be applied to the badge map and profile badge maps, for example to show all the badges that a student could possibly earn, all the badges the student has earned, or badges not yet earned, and by subject matter, grade level, or other criteria. As noted, badge maps may be displayed in different shapes, such as on a circular color spectrum or grid pattern. As a student completes lessons and courses and earns achievements, profile badges will be related in a holistic manner. It should be apparent that different users will display different "shapes" of learnings through their profile badge maps, creating an even more powerful understanding of those learnings. Different strengths will then be highlighted amongst users and that information can be used for future careers or collaborations.

Figure 11:
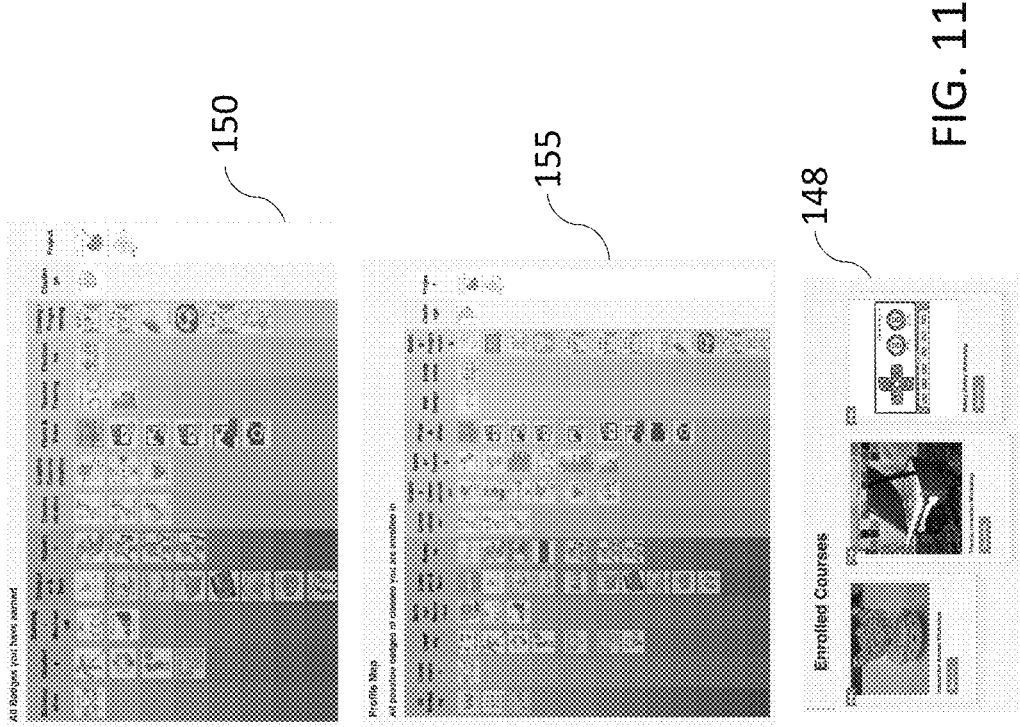
FIG. 11 shows an example of a student profile within the present LMS.
Figure 11:
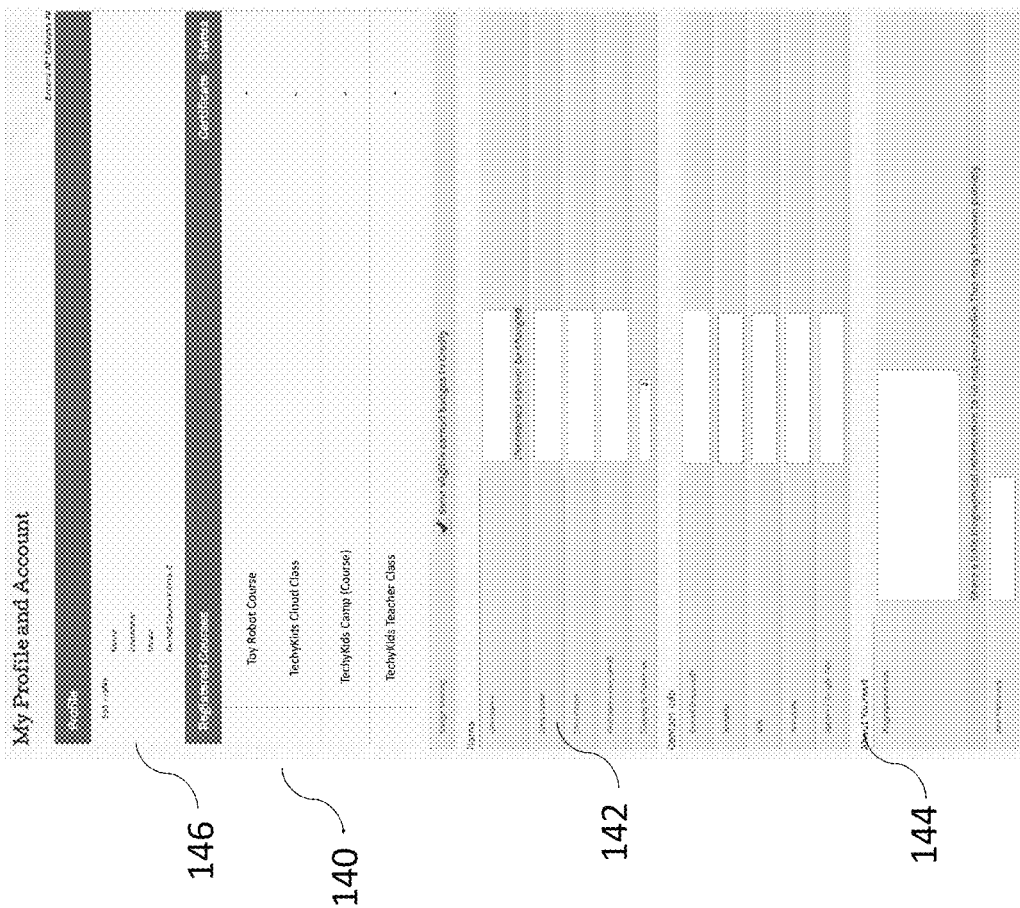

In addition to individual profile badge maps, student profiles 140 (see FIG. 11) may include student contact information 142, biographic information 144, information regarding courses in which a student is currently registered 146 and enrolled 148, completed projects/achievement 150 (e.g., which may be accessed through selection of the corresponding badges in the student's badge map), badges associated with classes in which the user is enrolled 155, notes that the student has taken, etc.

Figure 10:
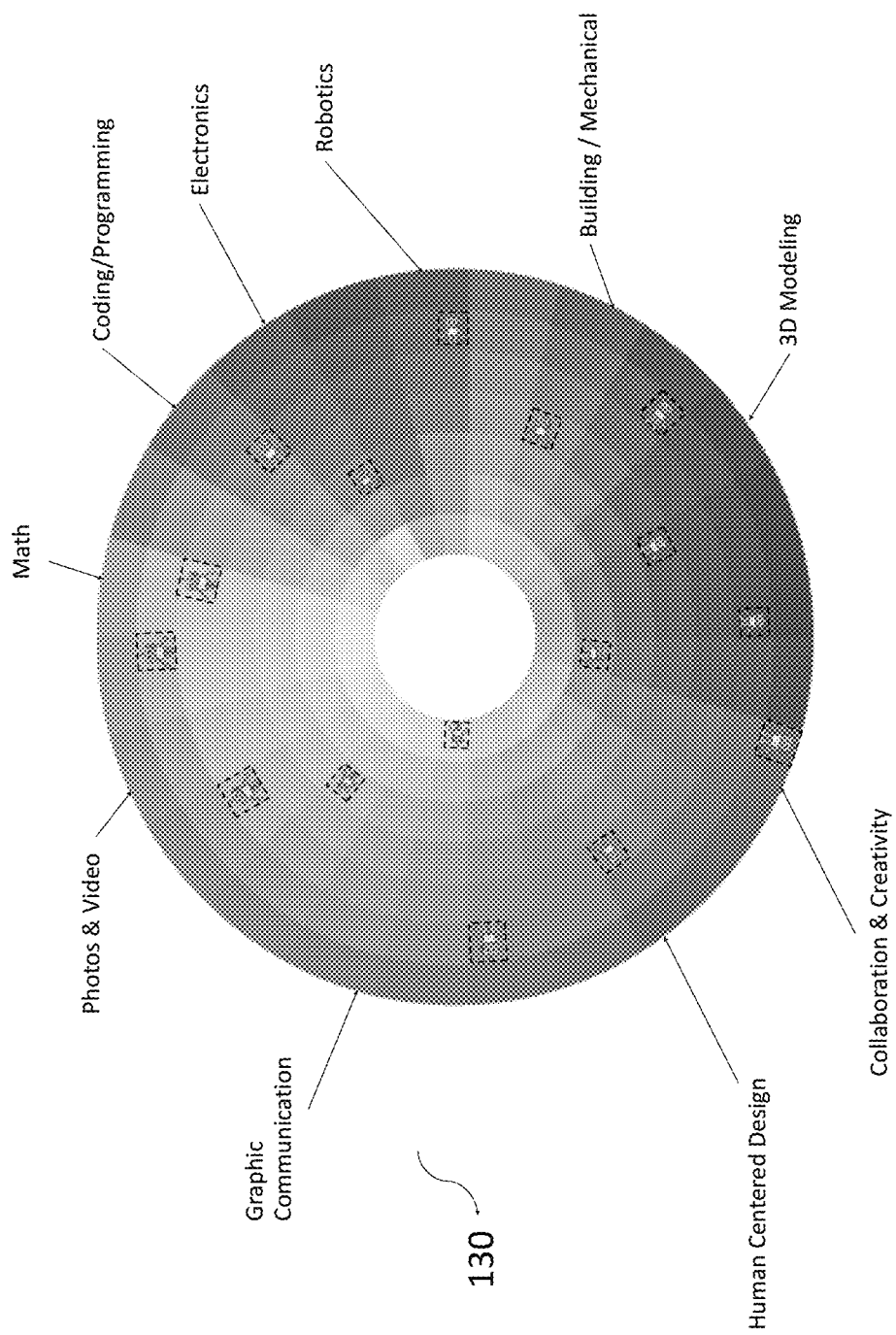
FIG. 10 shows an example of the LMS badge map presented in a circular form.

Badge maps, whether for individual students, projects, or other organizational elements may be represented in the grid fashion shown and described above, and/or in a circular form 140, shown in FIG. 10, e.g., in which color hue represents badge type (subject matter) and radial distance of a badge from a center of the circle represents required skill level or sequence of completion of the corresponding module. In some instances, badge maps may be represented in three-dimensional forms, such as cubes, etc. As indicated above, to allow for ease of viewing, the graphical images of the badges within a badge map may be displayed only when the badge map itself is displayed at some, but not all, magnification levels.

Thus, badge maps may be provided at the system and/or student level, and also may be provided at the level of a learning path/project. In this latter case, a badge map encompasses only the badge forms that exist in the project learning path, providing a visual representation for a user to see what he/she has completed, done and what remains to be done in order to complete a project. Regardless of its level of association within the present LMS, a badge map organizes various skill/knowledge and provides an overview of a wide range of subject matters available to be learned (the breadth) and the extent (the depth) to which each is explored. Unlike other systems, where a badge is just a visual representation of achievements, this system allows for users to start learning directly from the badge map as they understand the relative nature of breadth and depth, and desire to directly increase their skills of subject matter not yet explored.

Figure 12A:
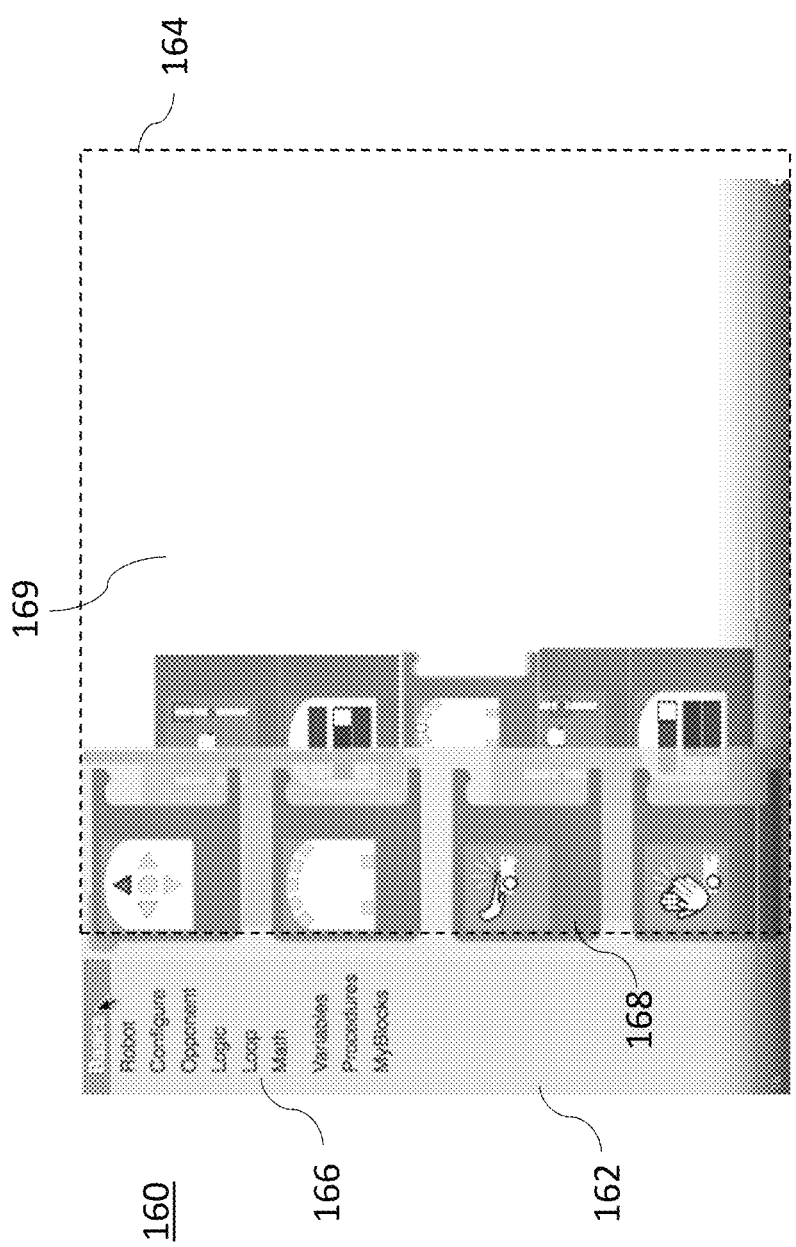
FIGS. 12A-12C illustrate an example of instructional content being played within one displayed content layer of the present GUI while a presentation is rendered within another displayed content layer of the GUI within which a user may manipulate objects.
Figure 12B:
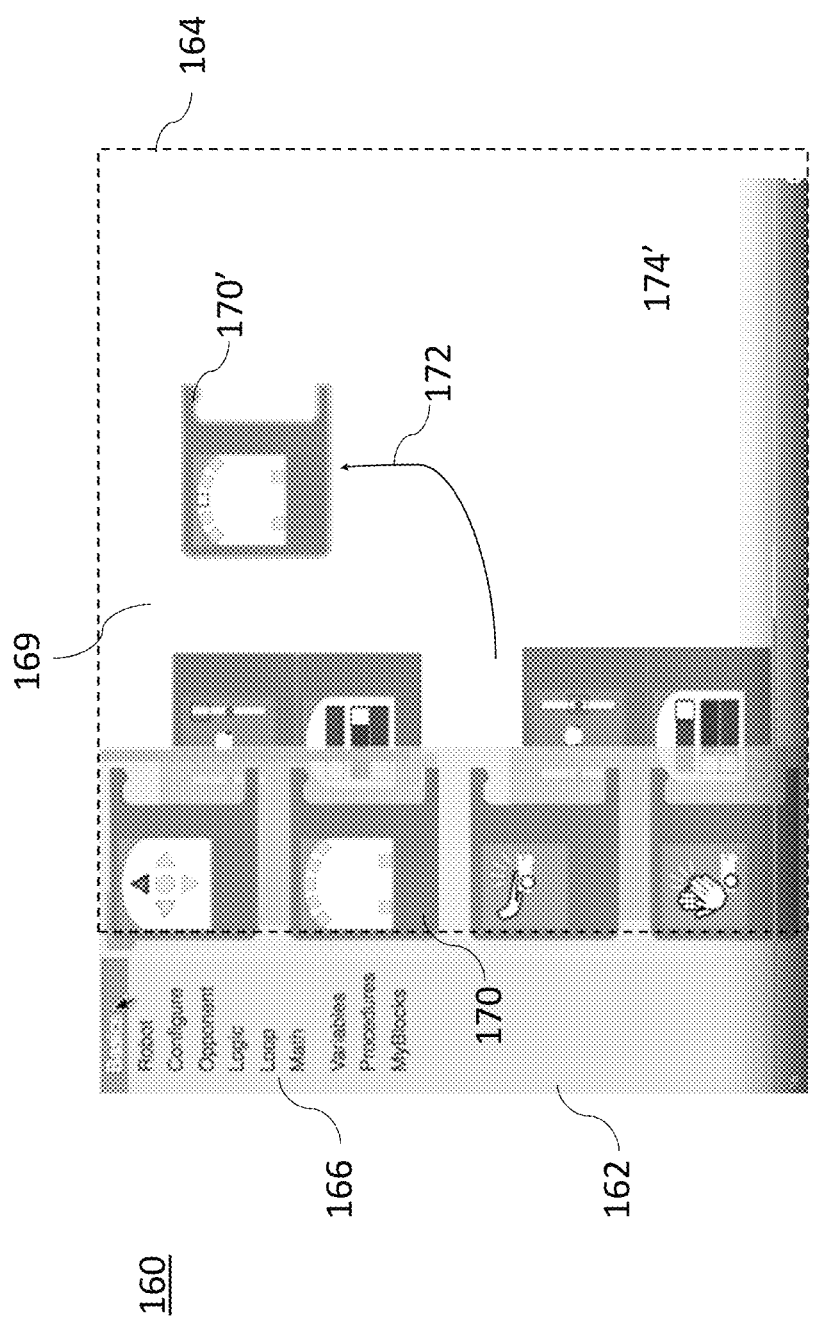
Figure 12C:
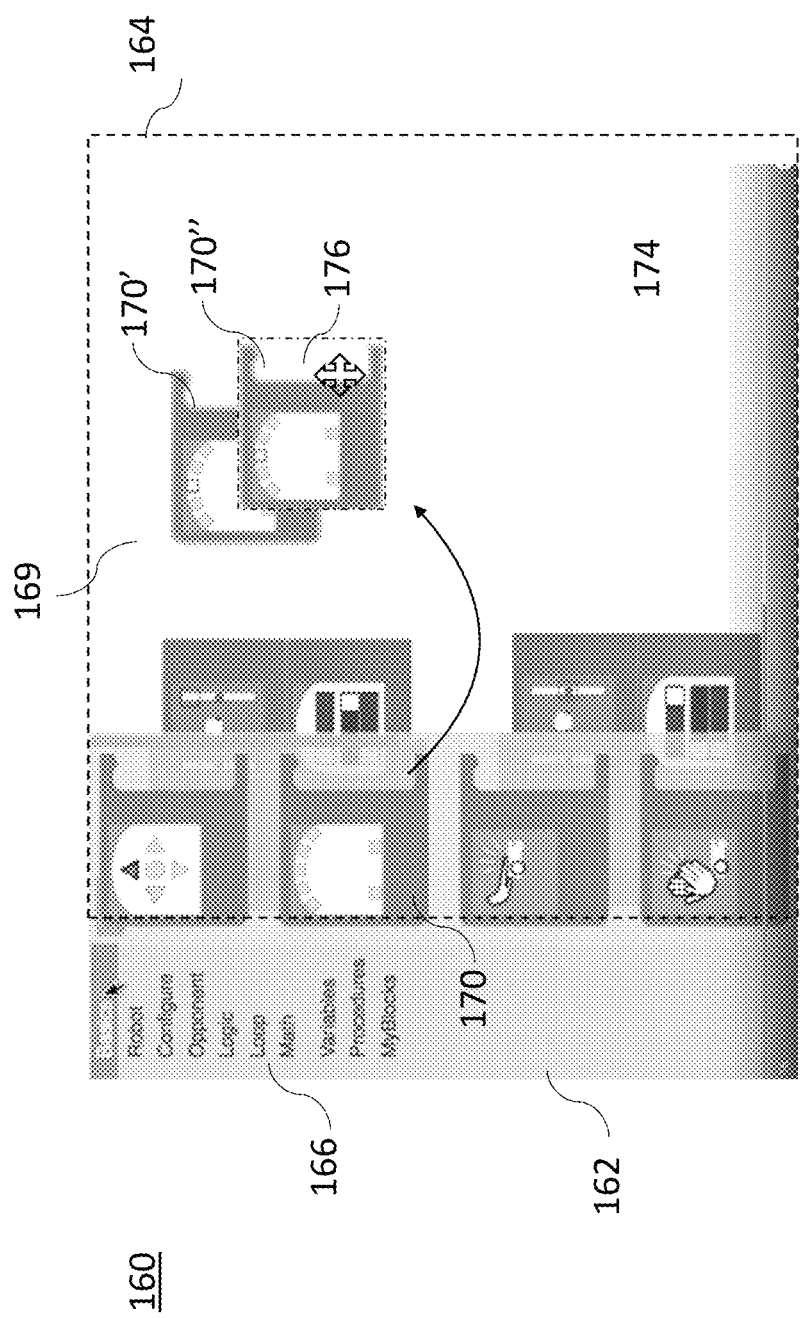

Referring now to FIGS. 12A-12C, another aspect of the present GUI is highlighted—in particular, a visual underlay or overlay that allows students to learn aspects of visual, block-based programming through mimicry. In FIG. 12A, a portion of the present GUI 160 is shown. In some embodiments, this may be a portion of the course creation workspace described above, while in other instances it may be a different screen of the GUI. Within GUI 160, two content layers are displayed, one superimposed over the other. A first, or upper, content layer 162 includes a menu 166 having some associated lesson or other blocks 168. This first content layer corresponds to the user-accessible portion of the GUI; that is, the elements rendered in the first content layer are user-selectable to create courses, etc., as described above. In a second, or lower (e.g., underlaid), content layer 164, shown in dashed outline, a video 169 is played (e.g., in an appropriate player application). The video includes a representation of the menu and lesson blocks that appear in the first, or upper, content layer 162.

In FIG. 12B, the video has played within the second content layer 164, and advanced to a frame at which a representation of a lesson block 170', corresponding to lesson block 170 in the first content layer, has been dragged 172 into a representation of a workspace 174'. At this point, the video pauses as an indication that the viewer should replicate the selection and movement of the lesson block 170 from the first content layer.

In FIG. 12C, the user has selected a copy of block 170 and is in the process of dragging and dropping the copy 170" into position within workspace 174 in the first, or upper, content layer 162. The position of the copy 170" is controlled using cursor 176. While the copy of the block is being dragged into position, it may be highlighted, for example it may be shown in dashed outline or other form, so as to indicate it is the subject of the user's cursor control actions. When the block is correctly placed within the workspace 174, e.g., on top of the corresponding object 170' in the second content layer 164, this highlighting may be removed and the video being payed within the second content layer may resume play. Placement of the blocks may be monitored by the system using cursor control references as is common in the graphical user interface arts.

Thus, the present GUI permits the course creation workspace to be rendered within one content layer while a video presentation is played within a second content layer so as to appear it is beneath the course creation workspace. The video can be used to demonstrate drag and drop techniques for creating a project, etc. For example, blocks representing corresponding ones of at least some of the modules rendered within the first displayed content layer may be represented within the video played within the second content layer. The modules rendered within the first displayed content layer are made selectable by a user, e.g., via manipulation of a cursor control device such as a mouse or touch screen, to mimic displacement and organization of corresponding ones of the blocks included within the video rendered within the second displayed layer. Such a video underlay technique is not restricted to the GUI for the LMS described herein, and may be more generally applied in any GUI to teach drag and drop programming techniques for visual, block-based programming.

In other embodiments the order of the content layers may be reversed. That is, the presentation which the user is to follow may be rendered in a content layer that is displayed so as to appear above the content layer in which the user is allowed to manipulate objects using a cursor control device such as mouse or touch screen. In such instances, the content layer in which the presentation is played should be rendered in a semi-transparent fashion so that the content layer in which the user manipulates objects shows through. Also, the presentation is not limited to being just a video presentation. In general, in either embodiment, the presentation may be an audio-video presentation, a video presentation, or an animated video or audio-video presentation.

Thus technique for presenting instructional content in an underlay or overlay to a user's work space in a user interface is not limited to teaching creation of learning paths, and may be applied to any block-based programming. The same technique may also be applied to teaching 3D modeling, digital game creation and playing, and virtual or augmented reality programming or use. In block-based programming, digital objects (such as the blocks of the present GUI) represent executable code and are moved around the screen to assemble an overall program. The present invention helps users learn block-based languages in a way that is more intuitive by using visual and/or auditory means to impart information to the user, and also allows users to mimic operations without switching context. Further, the visual area in which the coding language is presented does not need to be moved or altered in order to impart instructional information.

In one embodiment, the content layer in which the instruction is presented may be brought to the foreground in the GUI while playing, and then moved to the background or made transparent when the user pauses the playback (e.g., by invoking a playback command that is either presented on-screen or executed in response to a keyboard or cursor control action). The user may, for example, toggle between content presentation layers by invoking on-screen commands or by executing keyboard or mouse operations. Alternatively, a more automated approach may be used in which the presentation automatically pauses at points to allow a user to complete a just-instructed operation. Such an automated pause in the instructional content prompts a user to take action. When the user completes goals successfully, the instruction continues; otherwise, if the user does not successfully complete the goal of the instruction, another flow of instructional actions is taken.

The present underlay/overlay technique that allows instructional content to play in one layer of the GUI while the user/student is allowed to practice the skills being taught in a second layer of the GUI, all without having to switch between screens or otherwise switch context. The instructional content need not necessarily be prerecorded and could also be a screenshare or other real-time presentation from an instructor's screen, etc. One of the instructional content layer and the user working layer is made semi-transparent to allow the other to show through, or, the layers may alternate being presented in the foreground of the GUI according to user command or automatically according to pauses in the content played in the instructional layer. This alternating of a foreground layer may be well suited for displays of smaller size where playing one layer on top of another is inconvenient or restrictive in terms of the viewable area. The user manipulations of objects in the user's working layer and keystrokes may be tracked so as to recognize when the user has successfully completed operations demonstrated in the instructional content layer. Further, color coding may be used to indicate when a user has successfully completed an operation. For example, block colors may be changed when the user has successfully mimicked the operation being demonstrated in the instructional content. If mistakes are made, remedial instructional content may be played, or tool tips may be provided as hints to prompt a user to take corrective action. When the instruction concerns computer script or the like, the user's script may be executed (e.g., in a sandbox environment) to determine whether or not it has successfully been completed.

Figures 13, 14:
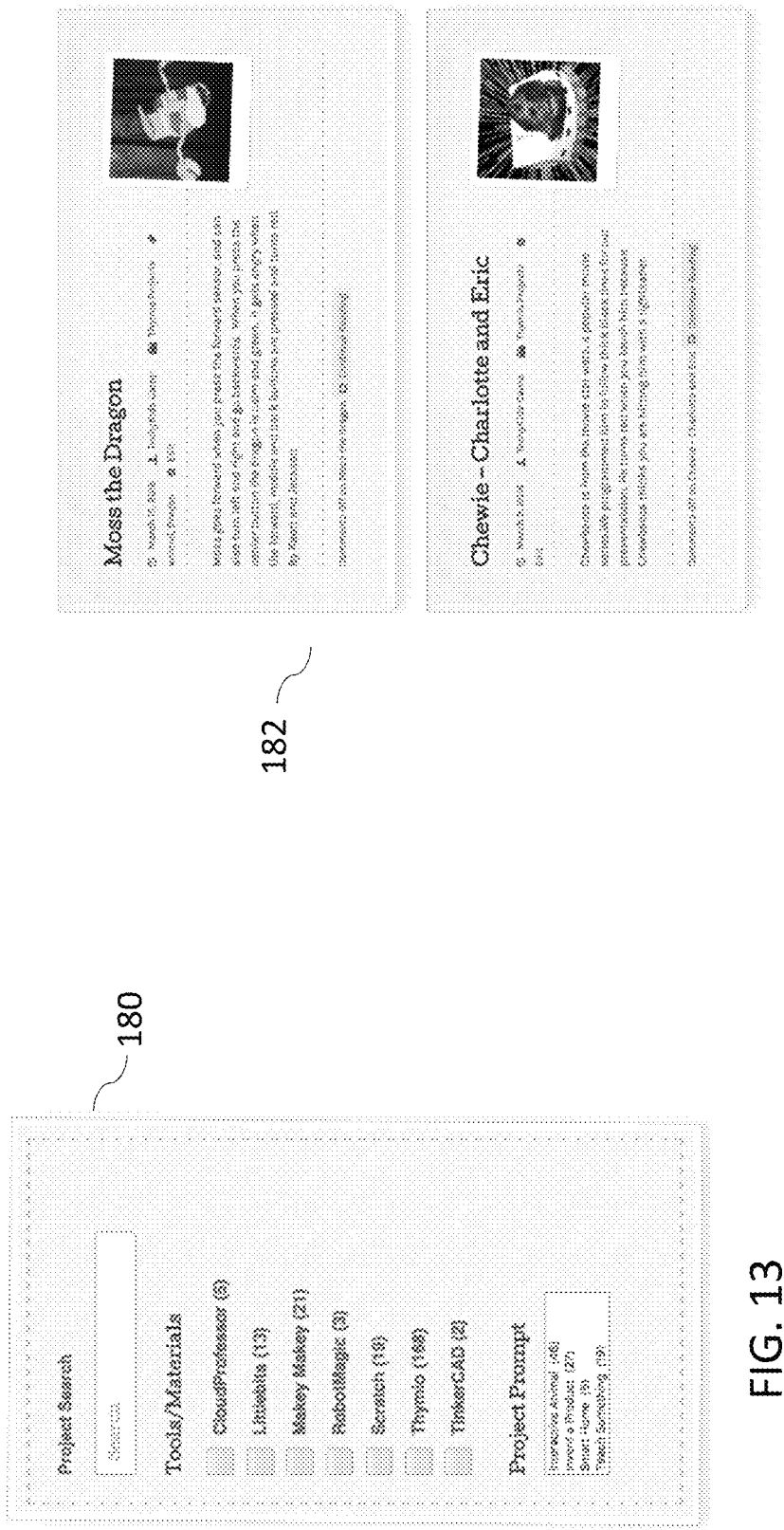
FIG. 13 shows a search menu that allows students to search for projects/courses based on attributes/tags associated with the courses.
FIG. 14 illustrates an example of search results displayed in a results page.

The present GUI also provides facilities for students to search projects/courses/lessons and enroll in them. Or, in some cases a student may be directed to a course or membership that will provide access to designated courses. As shown in FIG. 13, a search menu 180 allows students to search for projects/courses based on attributes/tags associated with the courses, e.g., the lessons within learning paths that define the courses. Courses may also be searched based on attributes such as materials used during the course, age/grade level, subject matter, etc. Search results may be displayed in a results page 182, as illustrated in FIG. 14. The results may be ranked according to desired criteria, including but not limited to popularity, availability, and course creator.

In some embodiments, search result can appear more personalized; showing courses and projects relative to students' already earned skills, and may reflect difficulty relative to system and teacher/peer-assessed ability, skills, and preferences. Courses and projects can reflect scores relative to user match and preferences. The LMS can also seek similar user profiles and make recommendations based on similar users, projects and so forth. Information concerning relative course difficulty can be provided, or how many more achievements/skills/lessons/badges one would need to earn in order to be able to successfully complete other projects and courses that exist on system. The LMS can make similar recommendations based on the various mediums and materials the user has indicated they have or have used in the past. Learners/students can also make their own learning paths with blocks they have access to and can also enroll into more courses or increase membership levels in order to gain access to more blocks that can be built with to form custom courses and projects. The LMS will also then be able to make suggestions of paths/courses/projects and skills that student may desire to take.

Figure 15:
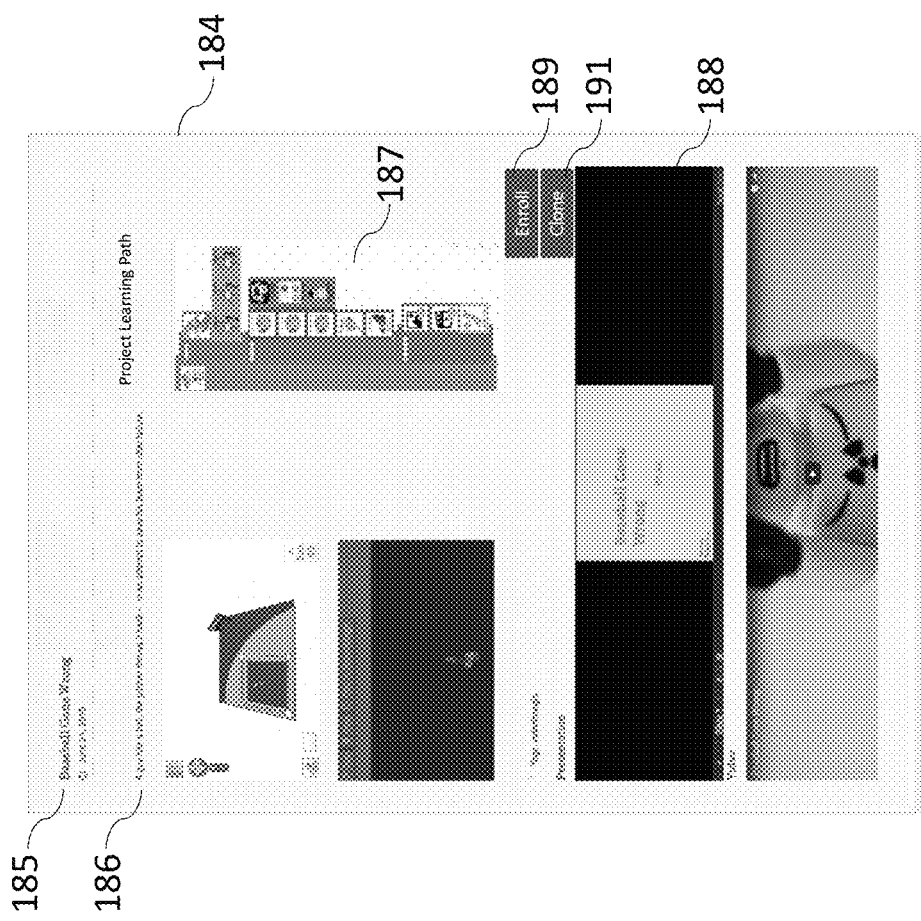
FIG. 15 shows an example of a project page that includes information about a project, in accordance with one embodiment of the invention.

Using the search results, users may select projects/courses for review. Selecting a project from the search results page opens an associated project page 184, as shown in FIG. 15. A project page includes information about the project, such as a title 185, a description 186, and an associated learning path 187 that shows the lessons, mediums, and deliverables (and, hence, the badges) associated with the project. In addition, one or more interactive elements 188, such as audio-video presentations, executable programs, embedded games, three dimensional models, etc., may be included to demonstrate examples of deliverables to be completed during the project. When these work products have been completed by previous students, making them available for view by others allows the others to provide feedback as well as to gain inspiration. A student may enroll in the project course by selecting the Enroll button 189. Enrolling causes the course and associated badges to become available within the student's profile page, populates the student's badge map with not-yet-earned badges associated with the project, and updates the teacher's dashboard (discussed below) with the information. A student may clone the project's lesson path by selecting the Clone button 191

Figure 16:
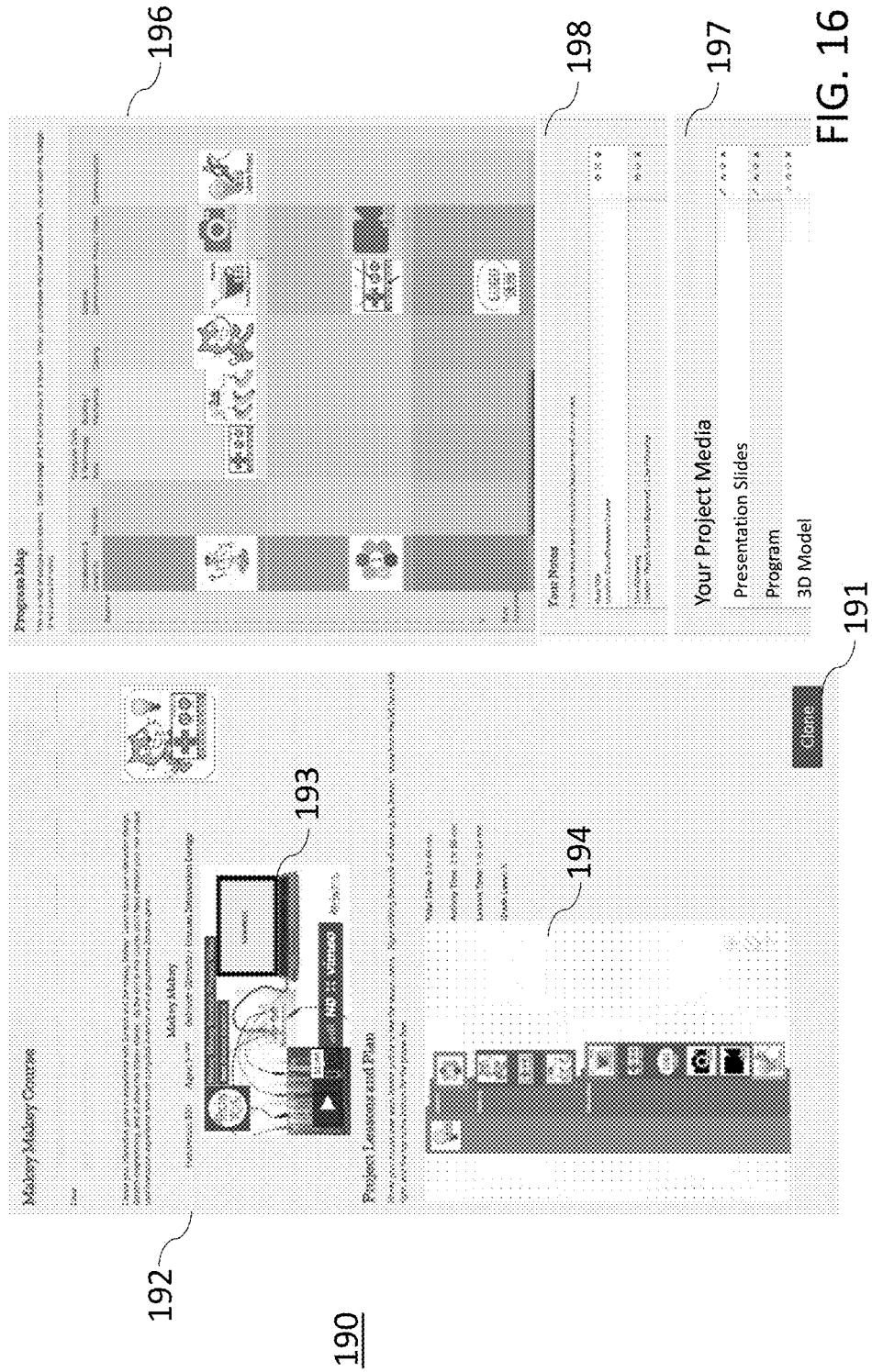
FIG. 16 shows an example of a course page, in accordance with one embodiment of the invention.

For each individual course in which a student is enrolled, a course page 190, such as that illustrated in FIG. 16, exists. The course page includes a course description 192, which may include an audio-video presentation 193 describing the course. A course/project learning path 194 is included (having been embedded in this page when course was created, as discussed above) and each block therein is selectable by the student to access the associated lesson page and materials. A progress map 196, which may be in the form of a badge map, is included to highlight the student's progress through the course material. For example, lessons which the student has completed may be represented as highlighted badges, while those yet to be completed may be shown only in outline or may be greyed out. Students may navigate courses by selecting the course blocks in the embedded learning path or via the badge map. A notebook section 198 is also provided and can be used by the student to collect notes taken during the course. Notes may be taken using a text editor. Project template files and user generated project components may also be found on the course page 197, allowing for creation, editing, and/or modification of a course. A link to stored working files may also be provided. The teacher project dashboard, discussed below, compiles these various student project media in order to track and review progress. A rubric on the side allows the teacher to easily give feedback to a student, publish feedback, add data to system, or transfer data to student information systems.

Students work through courses lesson-by-lesson. To begin a lesson, the user selects the corresponding lesson block from the learning path framework 194 or badge map 196. Upon such selection, a lesson page (such as one created from the template shown in FIG. 7) opens. Each lesson has some instructions and may have associated audio-video presentations, interactive media, and other content as shown in and described above with reference to FIG. 4D. The user reads the instructions and performs the actions instructed, for example by viewing the audio-video presentations, interacting with the specified media, or creating the assigned deliverable(s). Many of the lessons will have one or more associated quizzes to test the user's understanding and mastery of the subject matter. These quizzes must be completed before a user is permitted to earn the associated achievement badge. While the learning path provides a suggested path for completing the course lessons, in some cases that path may not be strictly enforced, and users may be permitted to complete lessons out of the sequence specified in the learning path. Highlighted or full color elements in the progress map 196 let a user know which lessons were actually completed.

When a user has completed a course, the user may have the option to publish one or more of his/her deliverables. Published materials are on the system portal, e.g., associated with the corresponding project pages, so that others (parents, teachers, other students, etc.) can review the work, optionally provide feedback, and be inspired by it. Options may also be provided for other users to enroll in the same course, or to clone it so that they might modify it and prescribe their own learning path.

As mentioned above, the present GUI also provides teachers various facilities, for example, the ability to add students to a class, to provide students a respective username and password, and to monitor student enrollment and progress. In one embodiment, teachers may be provided a newsfeed of their students' progress.

Figure 17:
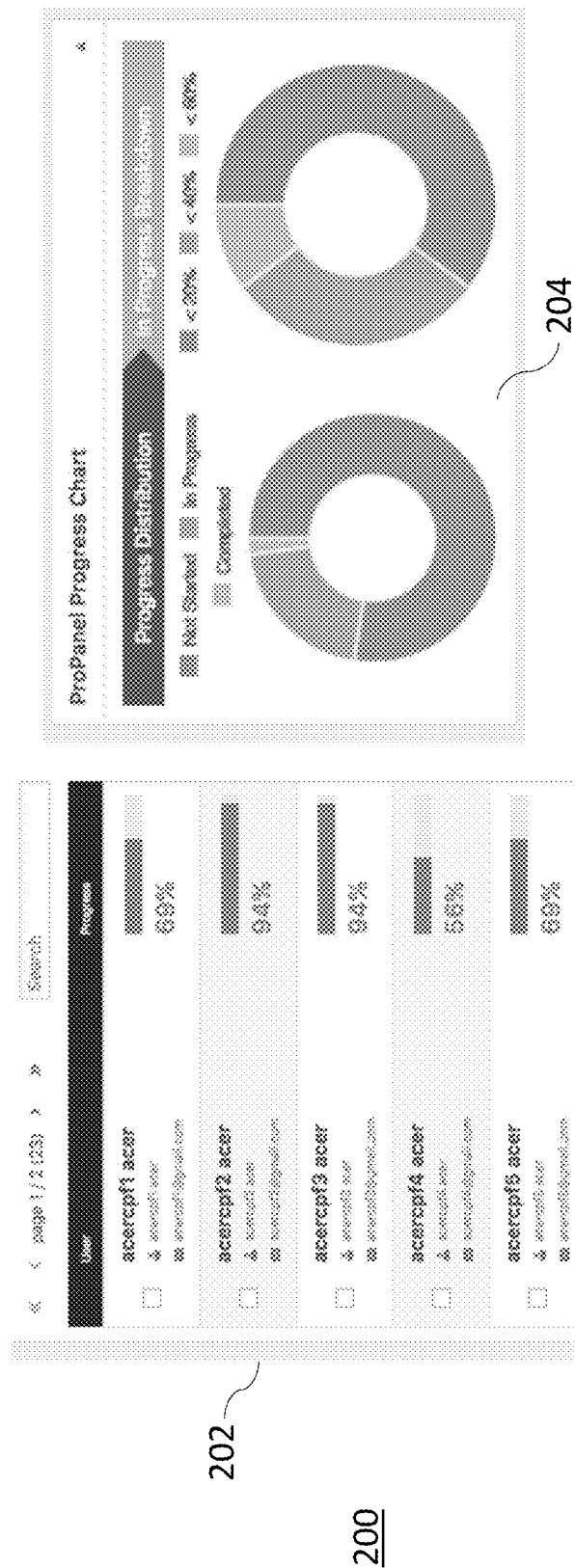
FIG. 17 shows an example of a portion of a teacher dashboard, in accordance with one embodiment of the invention.

A teacher dashboard 200, as illustrated in FIG. 17, may be provided to show recent activity concerning the teacher's students. For example, summary information such as the total number of students, pending assignments, the number of courses each student is enrolled in, and submitted projects awaiting the teacher's review. Information can be presented based on per-user 202 or-per-course 204 basis, and search results can be filtered by various criteria. Such a dashboard provides a convenient facility to compose and send email to students, either collectively, in designated groups, or individually. Dashboard data (e.g., course data, quiz data, etc.) can be exported in spreadsheet or other formats.

Figure 21:
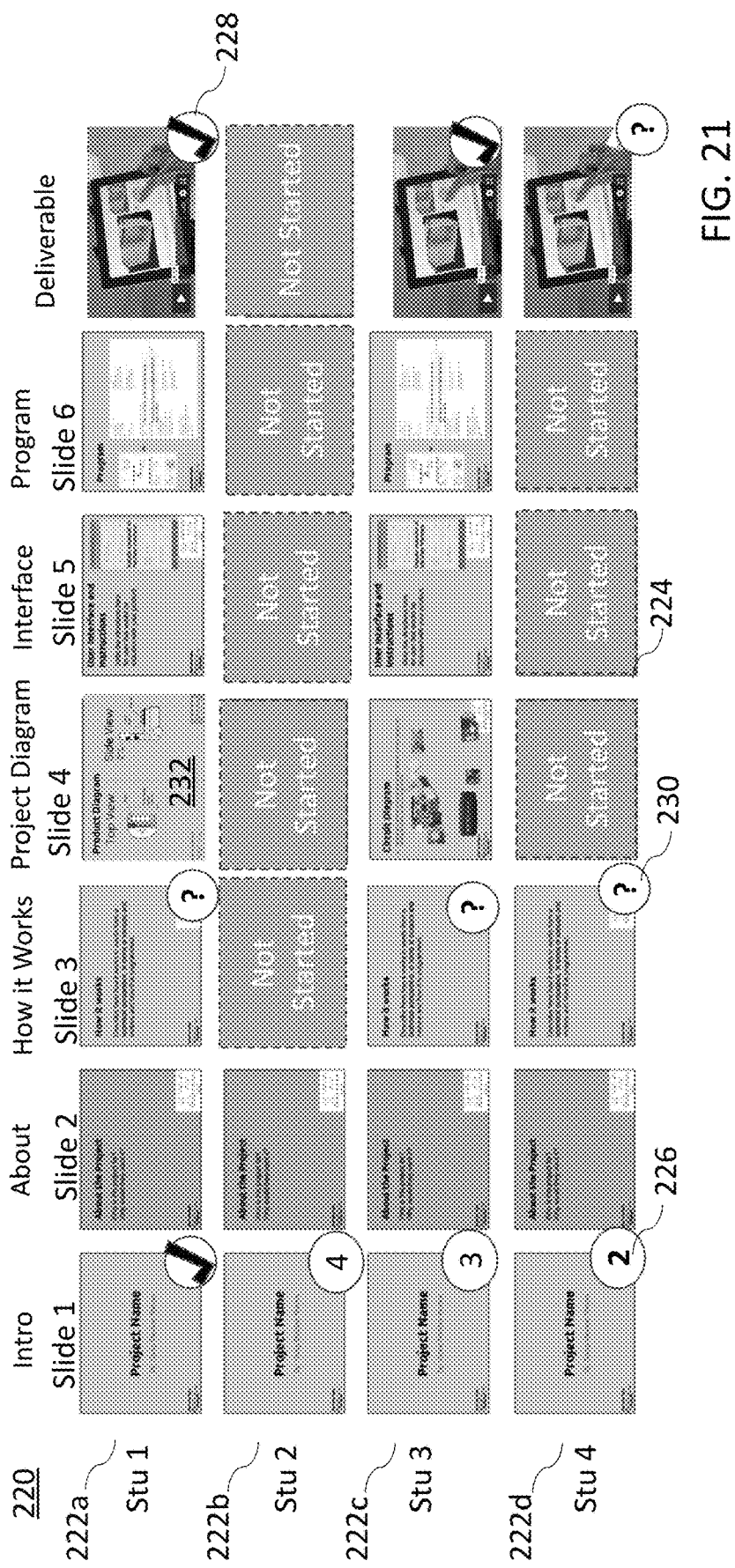
FIG. 21 shows an example of a teacher dashboard that facilitates review and scoring of projects with respect to an associated rubric.

FIG. 21 illustrates further aspects of the teacher's dashboard, in this example, a global view 220 of students' completed assignments for a particular course. In this example, the assignments include the presentation of slides 1-6 and a media deliverable (e.g., a movie). For each student 222a-222-d, copies of the respective slides and the movie, in their current state of completion, are represented, if available. These work product items can be viewed by selecting same (e.g., with a mouse click). If the student has not yet started an item, the absence thereof is noted by a "not completed" indication 224. The teacher's score for the competed work product is shown 226. Alternatively, pass/fail grading (indicated by a check mark 228) may be employed. If a work product has not yet been graded, a question mark may be shown 30.

Figure 22:
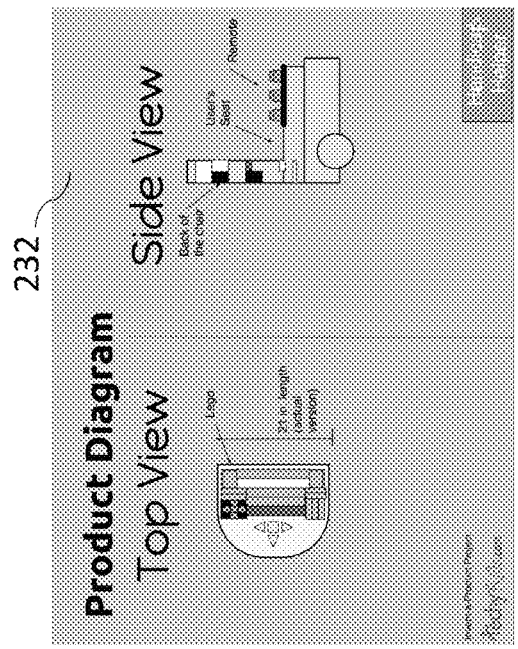
FIG. 22 is a further example of the teacher dashboard shown in FIG. 21, showing a focused view of a particular project and having a scoring pane.

FIG. 22 provides a further example of the teacher, showing a focused view of a particular project and having a scoring pane 234. In this example, a version of slide 4, 232, submitted by student 1 is being evaluated. The scoring pane provides the assessment criteria for this slide and the scores associated with successful fulfillment of the requirements. The scoring pane includes entry boxes 236a, 236b for the teacher to enter evaluations according to the assessment criteria. The individual assessment criteria scores may be averaged to report the score for the work product item shown in the overall view in FIG. 21.

From the above it should be apparent that embodiments of the invention may be implemented in various forms of computer software and hardware. Automated operations referred to herein are machine operations. Software implementations include various algorithms; that is, self-consistent sequence of steps leading to a desired result. Such software runs on hardware that may take the form of a computer system.

Computer systems upon or with which the methods of the present invention may be practiced will typically include a bus or other communication mechanism for communicating information, and one or more processors coupled with the bus for processing information. These computer systems will also include a main memory, such as a RAM or other dynamic storage device, coupled to the bus for storing information and instructions to be executed by the processor. Main memory also may be used for storing temporary variables or other intermediate information during execution of instructions to be executed by the processor. The computer system will further include a ROM or other static storage device coupled to the bus for storing static information and instructions for the processor. A storage device, such as a hard disk, is also typically provided and coupled to the bus for storing information and instructions. The subject computer system may include a display coupled to the bus for displaying information to a user. In such instances, an input device, including alphanumeric and other keys, is also often coupled to the bus for communicating information and command selections to the processor. Other types of user input devices, such as cursor control devices such as a mouse, a touch screen, a trackball, or cursor direction keys, are also included and coupled to the bus for communicating direction information and command selections to the processor and for controlling cursor movement on the display.

The computer system also typically includes a communication interface coupled to the bus which provides for two-way, wired and/or wireless data communication to/from the computer system, for example, via a local area network (LAN). The communication interface sends and receives electrical, electromagnetic or optical signals which carry digital data streams representing various types of information. For example, two or more computer systems may be networked together in a conventional manner with each using a respective communication interface. The network link typically provides data communication through one or more networks to other data devices. For example, the network link may provide a connection through a LAN to a host computer or to data equipment operated by an Internet service provider (ISP). The ISP in turn provides data communication services through the Internet, which, in turn, may provide connectivity to multiple remote computer systems. The computer system can send messages and receive data through the network(s), network link and communication interface.

Thus, a graphical user interface for a learning management system has been described. The modularity of the system allows communities of people to work together to form learning paths from community formed lesson blocks. Communities can also learn from one another's creations, building skills of learning and sharing their created projects and learning paths by which other users can use and modify to achieve their own learning and project goals. The comprehensive framework is mapped to a variety of subject matter and helps to understand users from an objective perspective of interests, strengths and abilities. Use of multimedia from a variety of content sources and tools are streamlined for the user. Personalization of learning and doing while tapping the community for growth and inspiration is achieved with this learning system.

What is claimed is:

1. A learning management system (LMS) comprising a processor and a memory coupled to a processor, said memory storing processor-executable instructions, which instructions when executed by said processor cause said processor to generate a graphical user interface (GUI) for said LMS, said GUI comprising:
   a plurality of graphical modules, each module representing one of a lesson, a medium, or a deliverable for a project, each of the modules having attributes which permit interconnection with compatible other ones of the modules within the context of the project when moved adjacent to one another within a course creation workspace;
   said course creation workspace comprising a visual editing facility allowing user assembly of said project through drag and drop interconnection of selected and compatible ones of said modules within defined lesson, medium, and deliverable regions of a project prompt that is a visual instantiation of learning goals associated with an educational standard;
   a menu adjacent one boundary of the course creation workspace, said menu allowing user navigation among collections of said modules; and
   an information ribbon adjacent a second boundary of the course creation workspace, wherein the information ribbon displays a minimum suggested grade level for said project and projected teaching times, activity times and total times for course material represented by those of said modules assembled within the course creation workspace, wherein said projected teaching times, activity times and total times are automatically updated as ones of said modules are associated with and dissociated from said project prompt.

2. The LMS of claim 1, wherein said GUI further includes a module editor having attribute fields for a user to define aspects of a desired module representing a lesson, a medium, or a deliverable, add content, and to provide a command to generate said desired module automatically, based on said defined aspects, wherein said module editor is selectable at least from said menu.

3. The LMS of claim 2, wherein said module editor is configured to allow user revision of an existing one of said plurality of modules through selection of an option to edit said existing one of said modules.

4. The LMS of claim 2, wherein said module editor is configured to allow user cloning of an existing one of said plurality of modules through selection of an option to clone said existing one of said modules.

5. The LMS of claim 1, wherein the menu includes options for filtering said collections of said modules by one or more attributes.

6. The LMS of claim 1, wherein user navigation via the menu is restricted according to one or more of user type, user role, user group, and user enrollment.

7. The LMS of claim 1, wherein each of said plurality of modules is visually represented by a block having a plurality of interconnection points and a graphical image.

8. The LMS of claim 7, wherein said GUI further includes a badge map, said badge map comprising a collection of badges, each having a respective graphical image which corresponds to a graphical image of a respective block that visually represents a respective one of said modules accessible via said menu, wherein said badges are organized by type and required skill level of the modules to which the corresponding badges pertain.

9. The LMS of claim 1, wherein said GUI further includes a plurality of student profiles, each of the plurality of student profiles associated with a respective student, and each including a student badge map in which a collection of badges, each having a respective graphical image which corresponds to a graphical image of a respective block that visually represents a respective one of said modules accessible via said menu is displayed.

10. The LMS of claim 9, wherein said badges are organized by type and required skill level of the modules to which the corresponding badges pertain, and which have been completed by the respective student.

11. The LMS of claim 10, wherein within the circular form, color represents badge type and radial distance of a badge from a center of the circle represents required skill level of the corresponding module.

12. The LMS of claim 9, wherein said badges are organized by date on which the modules to which the corresponding badges pertain have been completed by the respective student.

13. The LMS of claim 9, wherein each student badge map is represented in a circular form.

14. The LMS of claim 9, wherein each student badge map is represented in a two-dimensional grid form.

15. The LMS of claim 9, wherein the graphical images of the student badge map are displayed within the student badge map only when the student badge map is displayed at some, but not all, magnification levels.

16. The LMS of claim 1, wherein said GUI further includes a learning path generator within which a learning path for the project is automatically created as ones of said modules are associated with and dissociated from said project prompt, said learning path represented by respective graphical images which correspond to respective blocks that visually represent respective ones of said modules accessible via said menu.

17. The LMS of claim 16, wherein said GUI further includes a presentation generator within which presentation objects associated with ones of said modules are automatically created and organized in sequence as said ones of said modules are associated with and dissociated from said project prompt.

18. The LMS of claim 1, wherein said GUI further includes a user selectable element for publishing said project.

19. The LMS of claim 1, wherein the GUI further includes (i) a course creation workspace rendered within a first displayed content layer of the GUI, and (ii) a second displayed content layer within which is rendered one of a video presentation, an audio-video presentation, or an animated video or audio-video presentation, said presentation displayed within the GUI so as to appear to be above or below the first displayed content layer to demonstrate drag and drop programming techniques and including blocks representing corresponding ones of at least some of the modules rendered within the first displayed content layer, said modules rendered within the first displayed content layer being selectable by a user via manipulation of a cursor control device to mimic displacement and organization of corresponding ones of the blocks included within the presentation rendered within the second displayed layer.

* * * * *